(12) United States Patent
Hosseini et al.

(10) Patent No.: US 11,490,434 B2
(45) Date of Patent: Nov. 1, 2022

(54) DUAL CONNECTIVITY TRANSMISSION TECHNIQUES

(71) Applicant: QUALCOMM incorporated, San Diego, CA (US)

(72) Inventors: Seyedkianoush Hosseini, San Diego, CA (US); Xiao Feng Wang, San Diego, CA (US); Heechoon Lee, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/449,307

(22) Filed: Jun. 21, 2019

(65) Prior Publication Data
US 2019/0394822 A1  Dec. 26, 2019

Related U.S. Application Data

(60) Provisional application No. 62/689,825, filed on Jun. 25, 2018.

(51) Int. Cl.
*H04W 76/15* (2018.01)
*H04L 5/00* (2006.01)
(Continued)

(52) U.S. Cl.
CPC ........... *H04W 76/15* (2018.02); *H04L 5/0051* (2013.01); *H04L 5/0055* (2013.01);
(Continued)

(58) Field of Classification Search
CPC ....... H04W 76/15; H04W 76/10; H04W 8/24; H04W 8/22; H04W 56/0045; H04W 56/004; H04W 72/0473; H04W 72/044; H04W 72/10; H04W 72/04; H04W 72/14; H04W 72/12; H04W 88/06; H04W 88/02;
(Continued)

(56) References Cited

U.S. PATENT DOCUMENTS

2014/0192686 A1* 7/2014 Hammarwall ........ H04L 5/0035
370/280
2015/0208366 A1* 7/2015 Papasakellariou .... H04L 1/1861
370/311

(Continued)

OTHER PUBLICATIONS

International Search Report and Written Opinion—PCT/US2019/038964—ISA/EPO—dated Sep. 10, 2019 (183909WO).

*Primary Examiner* — Jeffrey M Rutkowski
*Assistant Examiner* — Sudesh M Patidar
(74) *Attorney, Agent, or Firm* — Holland & Hart LLP/Qualcomm Incorporated

(57) ABSTRACT

Methods, systems, and devices for wireless communication are described. A user equipment (UE) may receive multiple uplink grants that schedule uplink transmissions for two different radio access technologies (RATs) during overlapping time resources. The UE may adjust the power for one of the uplink transmissions based on the temporal proximity of the second received uplink grant relative to the first uplink transmission. The UE may adjust the power of the uplink transmission by partially or completely reducing its power.

30 Claims, 20 Drawing Sheets

(51) Int. Cl.
    *H04W 8/24*     (2009.01)
    *H04W 56/00*    (2009.01)
    *H04W 72/04*    (2009.01)
    *H04W 72/10*    (2009.01)
    *H04W 72/14*    (2009.01)
    *H04W 88/06*    (2009.01)

(52) U.S. Cl.
    CPC ............ *H04L 5/0082* (2013.01); *H04W 8/24* (2013.01); *H04W 56/0045* (2013.01); *H04W 72/0473* (2013.01); *H04W 72/10* (2013.01); *H04W 72/14* (2013.01); *H04W 88/06* (2013.01)

(58) Field of Classification Search
    CPC ......... H04W 72/1268; H04W 72/1263; H04W 52/346; H04W 52/34; H04W 52/36; H04W 52/367; H04W 52/146; H04L 5/0048; H04L 5/0051; H04L 5/0053; H04L 5/0055; H04L 5/0078; H04L 5/0082; H04L 5/0005; H04L 5/0058; H04L 5/0064; H04L 5/0091; H04L 5/0094
    See application file for complete search history.

(56) References Cited

U.S. PATENT DOCUMENTS

| | | | |
|---|---|---|---|
| 2015/0358915 A1* | 12/2015 | Semaan | H04W 52/367 |
| | | | 370/329 |
| 2016/0044606 A1 | 2/2016 | Yin | |
| 2016/0183323 A1* | 6/2016 | Rahman | H04W 72/042 |
| | | | 370/329 |
| 2017/0135097 A1 | 5/2017 | Yi et al. | |
| 2017/0202025 A1 | 7/2017 | Ouchi et al. | |
| 2018/0014255 A1 | 1/2018 | Pelletier et al. | |
| 2018/0110047 A1 | 4/2018 | Babaei et al. | |
| 2018/0359790 A1* | 12/2018 | Ingale | H04W 28/16 |
| 2019/0044639 A1* | 2/2019 | Ouchi | H04W 52/18 |
| 2019/0159136 A1* | 5/2019 | MolavianJazi | H04L 5/001 |
| 2019/0174432 A1* | 6/2019 | Wang | H04W 52/365 |
| 2019/0223115 A1 | 7/2019 | Chen et al. | |
| 2019/0261280 A1* | 8/2019 | Jung | H04W 52/146 |
| 2019/0320396 A1* | 10/2019 | Bagheri | H04W 52/346 |
| 2019/0320467 A1* | 10/2019 | Freda | H04W 74/0833 |
| 2019/0335463 A1* | 10/2019 | Ng | H04L 5/001 |
| 2019/0342890 A1* | 11/2019 | Tong | H04W 8/24 |
| 2020/0037255 A1* | 1/2020 | Liu | H04W 52/325 |
| 2020/0068504 A1* | 2/2020 | Yi | H04W 52/14 |
| 2020/0205228 A1* | 6/2020 | Takeda | H04W 52/30 |
| 2020/0396740 A1* | 12/2020 | Toeda | H04W 72/04 |

\* cited by examiner

DUAL CONNECTIVITY TRANSMISSION TECHNIQUES

CROSS REFERENCE

The present Application for Patent claims the benefit of U.S. Provisional Patent Application No. 62/689,825 by HOSSEINI et al., entitled "DUAL CONNECTIVITY TRANSMISSION TECHNIQUES," filed Jun. 25, 2018, assigned to the assignee hereof, and expressly incorporated herein.

BACKGROUND

The following relates generally to wireless communications, and more specifically to dual connectivity transmission techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some cases, a UE may be a multi radio access technology (RAT) dual connectivity (MR-DC) UE that supports simultaneous connections to two base stations using different RATs. For example, a UE may be connected to an LTE base station at the same time that it is connected to an NR base station. In such cases, uplink grants from the LTE base station and the NR base station may occasionally schedule uplink resources that collide (e.g., the UE may be assigned overlapping uplink resources in the time domain). The UE receiving these grants, however, may not be capable of transmitting both scheduled uplink transmissions (e.g., the UE may not have the power or processing resources to properly transmit both uplink transmissions).

SUMMARY

The described techniques relate to improved methods, systems, devices, and apparatuses that support dual connectivity transmission techniques. A user equipment (UE) may receive a first grant from an anchor base station using a first radio access technology (RAT). The first grant may be for a first uplink transmission scheduled for a first period of time. After the first grant, the UE may receive a second grant from a secondary base station using a second RAT. The second grant may be for a second uplink transmission scheduled for a second period of time. The UE may determine that the second period of time overlaps the first period of time and that it cannot transmit both uplinks at their respective transmit powers (e.g., as requested in each grant). Accordingly, the UE may adjust the transmit power for one of the uplinks, which may involve dropping a transmission for a given RAT or scaling down the power for one or more of the uplink transmissions. The UE may select which uplink to adjust based on the temporal proximity of the second grant with respect to the first uplink transmission scheduled by the first uplink grant.

A base station using a first RAT may receive an indication of a window from a UE. The window may define a period of time preceding an uplink transmission scheduled by another base station using a second RAT. The base station may determine that an uplink transmission corresponding to a grant sent during the window will be canceled by the UE if the uplink transmission coincides with another uplink transmission in the time domain. Accordingly, the base station may modify the timing of an uplink grant for the UE so that it is received by the UE before the window. Alternatively, the base station may modify the time resources for the uplink transmission so that they do not coincide with the time resources for the other uplink transmission.

A method of wireless communications at a UE in a dual connectivity system is described. The method may include receiving, from an anchor base station at a first time, a first grant for a first uplink transmission over a first set of time resources, where the first uplink transmission is via a first RAT, receiving, from a secondary base station at a second time, a second grant for a second uplink transmission over a second set of time resources that at least partially overlaps the first set of time resources, where the second uplink transmission is via a second RAT, determining transmit power for the first and second uplink transmissions based on the second time and a grant window associated with the first set of time resources, and transmitting one or both of the first uplink transmission and the second uplink transmission via at least a portion of the first set of time resources based on determining the transmit power.

An apparatus for wireless communications at a UE in a dual connectivity system is described. The apparatus may include a processor, memory coupled with the processor, and instructions stored in the memory. The instructions may be executable by the processor to cause the apparatus to receive, from an anchor base station at a first time, a first grant for a first uplink transmission over a first set of time resources, where the first uplink transmission is via a first RAT, receive, from a secondary base station at a second time, a second grant for a second uplink transmission over a second set of time resources that at least partially overlaps the first set of time resources, where the second uplink transmission is via a second RAT, determine transmit power for the first and second uplink transmissions based on the second time and a grant window associated with the first set of time resources, and transmit one or both of the first uplink transmission and the second uplink transmission via at least a portion of the first set of time resources based on determining the transmit power.

Another apparatus for wireless communications at a UE in a dual connectivity system is described. The apparatus may include means for receiving, from an anchor base station at a first time, a first grant for a first uplink transmission over a first set of time resources, where the first uplink transmission is via a first RAT, receiving, from a secondary base station at a second time, a second grant for a second uplink transmission over a second set of time resources that at least partially overlaps the first set of time resources, where the second uplink transmission is via a second RAT, determining transmit power for the first and second uplink transmissions based on the second time and a grant window associated with the first set of time resources, and transmitting one or both of the first uplink transmission and the second uplink transmission via at least a portion of the first set of time resources based on determining the transmit power.

A non-transitory computer-readable medium storing code for wireless communications at a UE in a dual connectivity system is described. The code may include instructions executable by a processor to receive, from an anchor base station at a first time, a first grant for a first uplink transmission over a first set of time resources, where the first uplink transmission is via a first RAT, receive, from a secondary base station at a second time, a second grant for a second uplink transmission over a second set of time resources that at least partially overlaps the first set of time resources, where the second uplink transmission is via a second RAT, determine transmit power for the first and second uplink transmissions based on the second time and a grant window associated with the first set of time resources, and transmit one or both of the first uplink transmission and the second uplink transmission via at least a portion of the first set of time resources based on determining the transmit power.

Some examples of the method, apparatuses, and non-transitory computer-readable medium described herein may further include operations, features, means, or instructions for determining the grant window with respect to the first set of time resources based on a capability of the UE.

Some examples of the method, apparatuses, and non-transitory computer-readable medium described herein may further include operations, features, means, or instructions for determining that the second grant may be received before a beginning of the grant window or during a first period of the grant window, and splitting a total transmit power of the UE between the first uplink transmission and the second uplink transmission.

Some examples of the method, apparatuses, and non-transitory computer-readable medium described herein may further include operations, features, means, or instructions for determining the transmit power for the first uplink transmission to be zero over a subset of the second set of time resources that overlap the first set of time resources, and transmitting only the second uplink transmission via the second set of time resources.

In some examples of the method, apparatuses, and non-transitory computer-readable medium described herein, the subset of the second set of time resources includes a set of overlapping symbols or slots.

Some examples of the method, apparatuses, and non-transitory computer-readable medium described herein may further include operations, features, means, or instructions for determining that the second grant may be received within a second period of the grant window, prioritizing the first uplink transmission and the second uplink transmission based on a traffic type associated with the first uplink transmission and a traffic type associated with the second uplink transmission, and determining whether to drop the first uplink transmission or the second uplink transmission based on the prioritizing, where the transmit power may be determined to be zero for the dropped first uplink transmission or the dropped second uplink transmission.

In some examples of the method, apparatuses, and non-transitory computer-readable medium described herein, the traffic type includes one of acknowledgement (ACK) information, negative ACK (NACK) information, a demodulation reference signal (DMRS), or ultra-reliable low latency communications (URLLC).

In some examples of the method, apparatuses, and non-transitory computer-readable medium described herein, the UE may be operating according to a repetition transmitting mode and the prioritization may be based on the repetition transmitting mode.

Some examples of the method, apparatuses, and non-transitory computer-readable medium described herein may further include operations, features, means, or instructions for determining that the second grant may be received within a third period of the grant window, determining the transmit power for the second uplink transmission to be zero, and transmitting only the first uplink transmission via the first set of time resources.

In some examples of the method, apparatuses, and non-transitory computer-readable medium described herein, the grant window at least partially overlaps the first set of time resources, where the transmit power for the first uplink transmission and the second uplink transmission may be determined on a per-symbol basis based on the grant window at least partially overlapping the first set of time resources. In some examples of the method, apparatuses, and non-transitory computer-readable medium described herein, the grant window is defined on a per-symbol basis for one or more symbols of the first set of time resources.

Some examples of the method, apparatuses, and non-transitory computer-readable medium described herein may further include operations, features, means, or instructions for transmitting, to at least one of the anchor base station or the secondary base station, an indication of the grant window.

Some examples of the method, apparatuses, and non-transitory computer-readable medium described herein may further include operations, features, means, or instructions for including a timing advance value with the indication of the grant window.

Some examples of the method, apparatuses, and non-transitory computer-readable medium described herein may further include operations, features, means, or instructions for receiving, at a third time, a third grant for a third uplink transmission over a third set of time resources that at least partially overlaps the first set of time resources, where the third uplink transmission may be associated with a subframe-based transmission time interval (TTI).

Some examples of the method, apparatuses, and non-transitory computer-readable medium described herein may further include operations, features, means, or instructions for determining to drop the first uplink transmission, the second uplink transmission, or the third uplink transmission based at least in part on the set of priorities, and determining transmit power for all undropped transmissions based on a total transmit power for the UE.

Some examples of the method, apparatuses, and non-transitory computer-readable medium described herein may further include operations, features, means, or instructions for determining transmit power for the first uplink transmission prior to receiving the second grant, and adjusting transmit power for the first uplink transmission after receiving the second grant.

In some examples of the method, apparatuses, and non-transitory computer-readable medium described herein, the first uplink transmission may be associated with a processing timeline different from the second uplink transmission.

In some examples of the method, apparatuses, and non-transitory computer-readable medium described herein, the first RAT includes one of a New Radio (NR) RAT or a Long Term Evolution (LTE) RAT and the second RAT includes the other of the NR RAT or the LTE RAT.

A method of wireless communication at a base station in a dual connectivity system is described. The method may include receiving an indication of a grant window value from a UE operating in dual connectivity mode based on a capability of the UE, identifying a first grant for a first set of time resources allocated to the UE for a first uplink transmission via a first RAT, determining a grant window for the UE based on the indication of the grant window value, where the grant window is determined with respect to the first set of time resources, determining a set of downlink resources for transmission of a second grant to the UE based on the grant window, where the second grant indicates a second set of time resources allocated to the UE for a second uplink transmission via a second RAT, and transmitting the second grant to the UE via the set of downlink resources.

An apparatus for wireless communication at a base station in a dual connectivity system is described. The apparatus may include a processor, memory coupled with the processor, and instructions stored in the memory. The instructions may be executable by the processor to cause the apparatus to receive an indication of a grant window value from a UE operating in dual connectivity mode based on a capability of the UE, identify a first grant for a first set of time resources allocated to the UE for a first uplink transmission via a first RAT, determine a grant window for the UE based on the indication of the grant window value, where the grant window is determined with respect to the first set of time resources, determine a set of downlink resources for transmission of a second grant to the UE based on the grant window, where the second grant indicates a second set of time resources allocated to the UE for a second uplink transmission via a second RAT, and transmit the second grant to the UE via the set of downlink resources.

Another apparatus for wireless communication at a base station in a dual connectivity system is described. The apparatus may include means for receiving an indication of a grant window value from a UE operating in dual connectivity mode based on a capability of the UE, identifying a first grant for a first set of time resources allocated to the UE for a first uplink transmission via a first RAT, determining a grant window for the UE based on the indication of the grant window value, where the grant window is determined with respect to the first set of time resources, determining a set of downlink resources for transmission of a second grant to the UE based on the grant window, where the second grant indicates a second set of time resources allocated to the UE for a second uplink transmission via a second RAT, and transmitting the second grant to the UE via the set of downlink resources.

A non-transitory computer-readable medium storing code for wireless communication at a base station in a dual connectivity system is described. The code may include instructions executable by a processor to receive an indication of a grant window value from a UE operating in dual connectivity mode based on a capability of the UE, identify a first grant for a first set of time resources allocated to the UE for a first uplink transmission via a first RAT, determine a grant window for the UE based on the indication of the grant window value, where the grant window is determined with respect to the first set of time resources, determine a set of downlink resources for transmission of a second grant to the UE based on the grant window, where the second grant indicates a second set of time resources allocated to the UE for a second uplink transmission via a second RAT, and transmit the second grant to the UE via the set of downlink resources.

In some examples of the method, apparatuses, and non-transitory computer-readable medium described herein, determining the set of downlink resources may include operations, features, means, or instructions for determining that the second set of time resources at least partially overlaps with the first set of time resources.

Some examples of the method, apparatuses, and non-transitory computer-readable medium described herein may further include operations, features, means, or instructions for receiving the second uplink transmission from the UE via the second set of time resources.

In some examples of the method, apparatuses, and non-transitory computer-readable medium described herein, identifying the first grant may include operations, features, means, or instructions for receiving, from a second base station, an indication of the first grant via a backhaul link, where the second base station supports communications via the first RAT.

Some examples of the method, apparatuses, and non-transitory computer-readable medium described herein may further include operations, features, means, or instructions for exchanging a set of timing values with a second base station, where the grant window may be determined based on the set of timing values.

Some examples of the method, apparatuses, and non-transitory computer-readable medium described herein may further include operations, features, means, or instructions for transmitting the indication of the grant window or a grant window size to a second base station.

Some examples of the method, apparatuses, and non-transitory computer-readable medium described herein may further include operations, features, means, or instructions for selecting the set of timing values based on a processing timeline associated with the first uplink transmission or the second uplink transmission.

In some examples of the method, apparatuses, and non-transitory computer-readable medium described herein, the first uplink transmission may be associated with a processing timeline different from the second uplink transmission.

In some examples of the method, apparatuses, and non-transitory computer-readable medium described herein, the first RAT includes one of a NR RAT or an LTE RAT and the second RAT includes the other of the NR RAT or the LTE RAT.

DETAILED DESCRIPTION

A user equipment (UE) that is scheduled for two uplink transmissions at the same time over different radio access technologies (RATs) (e.g., Long Term Evolution (LTE) or New Radio (NR)), and which does not have enough power for both, may adjust the power for one of the uplink transmissions prior to transmission. The UE may adjust the power of the selected uplink transmission by partially reducing the power it was originally assigned. Alternatively, the UE may completely withdraw power from the selected transmission, effectively dropping the transmission.

The UE may select which uplink transmission to adjust based on the RAT associated with the uplink transmission. For example, the UE may adjust the power for the uplink transmission associated with its secondary cell group (SCG) so that it may use full power to transmit the uplink associated with its master cell group (MCG). Thus, when the UE is in Evolved Universal Terrestrial Radio Access (E-UTRA) NR Dual Connectivity (EN-DC), where the MCG is an LTE cell, the UE may prioritize LTE uplinks. When the UE is in NR-E-UTRA Dual Connectivity (NE-DC) mode, where the MCG is a NR cell, the UE may prioritize NR uplinks.

In some cases, the UE may select which uplink transmission to cancel or adjust based on the content carried by the uplink transmissions. For example, the UE may prioritize delay-sensitive data, such as hybrid automatic repeat request (HARM) traffic, ultra-reliable low latency communication (URLLC) traffic, and demodulation reference signals (DMRSs) over delay-tolerant data. Additionally or alternatively, the UE may prioritize data that is scheduled for repetition, or is related to data that has been subject to repetition.

Particular aspects of the subject matter described herein may be implemented to realize one or more advantages. The described techniques may support improvements in coverage area for UEs and increase the data rate of uplink and downlink transmissions, among other advantages. As such, supported techniques may include improved network operations and, in some examples, may promote network efficiencies, among other benefits.

Aspects of the disclosure are initially described in the context of wireless communications systems. Aspects are then described with respect to dual connectivity communications. Aspects of the disclosure are further illustrated by and described with reference to apparatus diagrams, system diagrams, and flowcharts that relate to dual connectivity transmission techniques.

Figure 1:
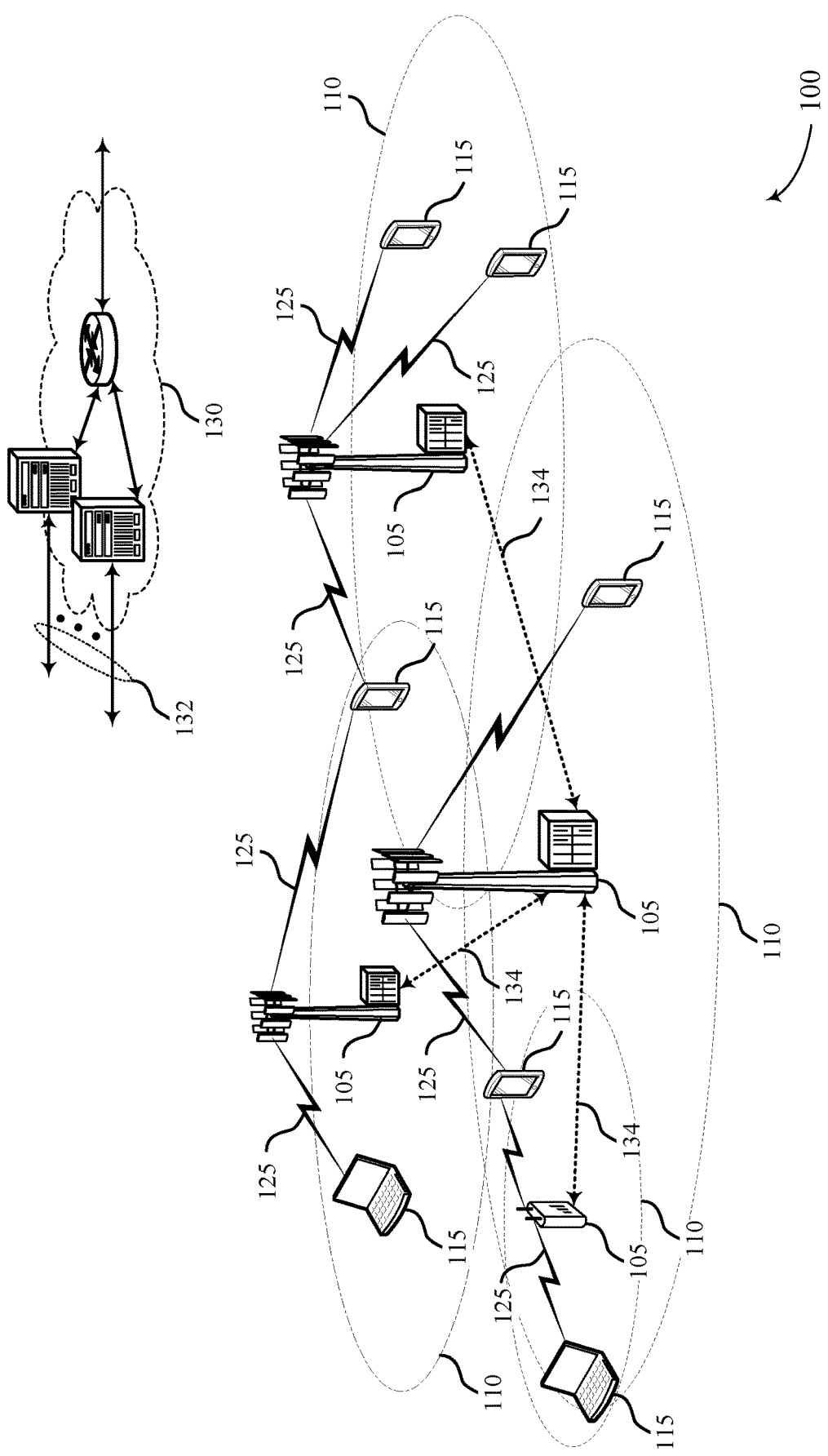
FIGS. 1 and 2 illustrate examples of wireless communications systems that support dual connectivity transmission techniques in accordance with aspects of the present disclosure.

FIG. 1 illustrates an example of a wireless communications system 100 that supports dual connectivity transmission techniques in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). When a subframe is the smallest scheduling unit in a system, the system may be referred to as a subframe-based system. In other cases, a smallest scheduling unit of the wireless communications system 100 may be shorter than a subframe or may be dynamically selected (e.g., in bursts of shortened TTIs (sTTIs) or in selected component carriers using sTTIs). When an sTTI is the smallest scheduling unit in a system, the system may be referred to as an sTTI-based system.

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM).

The organizational structure of the carriers may be different for different RATs (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that may support simultaneous communications via carriers associated with more than one different carrier bandwidths.

Wireless communications system 100 may support communication with a UE 115 on multiple cells or carriers, a feature which may be referred to as carrier aggregation or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may be concurrently connected to two different serving base stations 105 or serving cells. One of the base stations 105 may be an anchor base station 105 that is part of the MCG (which provides system information) and the other base station 105 may be a secondary station 105 that is part of the SCG. A UE 115 that is simultaneously connected to two different serving base stations 105 is said to be in dual connectivity mode, or to be engaging in dual connectivity communications. If the two base stations 105 operate according to different RATs, the UE 115 is said to be in multi-RAT dual connectivity (MR-DC) mode, or engaging in MR-DC communications.

In some scenarios, a UE 115 operating in MR-DC mode may be scheduled for two different uplink transmissions over two sets of time resources that overlap. But the UE 115 may not be able to supply the proper or requested power for both uplink transmissions. In such cases, the UE 115 may recognize its power limitations and select transmit powers for the uplink transmissions based on its available power. For example, the UE 115 may select a transmit power for an uplink transmission that is reduced from the transmit power the uplink transmission was originally assigned or allocated.

Alternatively, the base stations 105 serving the UE 115 may coordinate with each other and the UE 115 to avoid scheduling uplink transmissions over coincident time resources.

Figure 2:
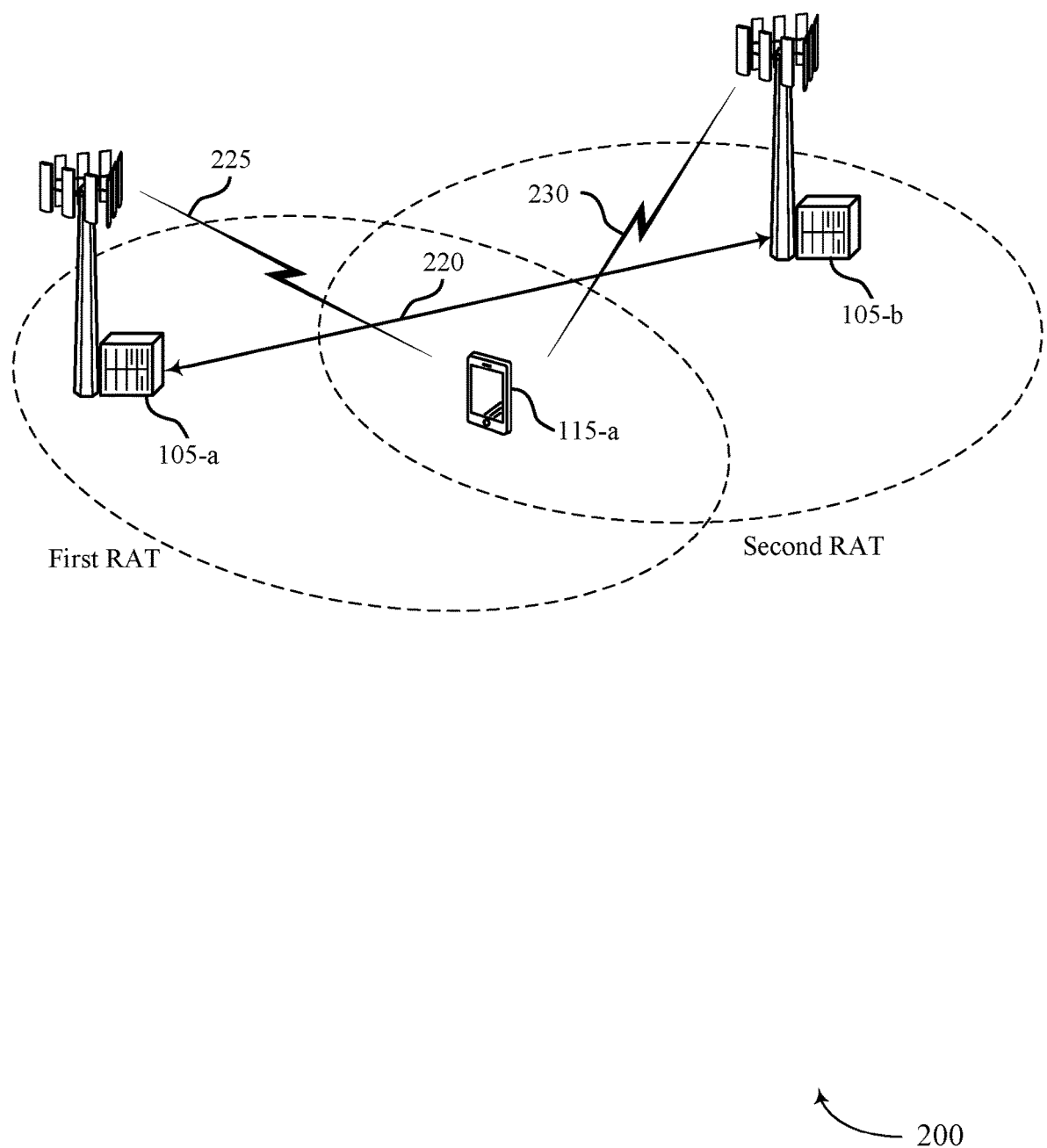

FIG. 2 illustrates an example of a wireless communications system 200 that supports dual connectivity transmission techniques in accordance with aspects of the present disclosure. In some examples, wireless communications system 200 may implement aspects of wireless communications system 100. Wireless communications system 200 may include a base station 105-*a*, base station 105-*b*, and a UE 115-A. Wireless communications system 200 may be a heterogeneous system that includes different RATs. For example, base station 105-*a* may be an LTE base station, or eNB, and base station 105-*b* may be a NR eNB, or gNB. Although shown as separate entities, base station 105-*a* and base station 105-*b* may co-located. UE 115-A may communicate with base station 105-*a* using LTE link 225 and communicate with base station 105-*b* use NR link 230. When UE 115-A is simultaneously connected to base station 105-*a* and base station 105-*b*, the UE 115-A is said to be in MR-DC mode (because base stations 105 operate using different RATs). Thus, wireless communications system 200 may also be referred to as a dual connectivity system.

While UE 115-A is in MR-DC, base station 105-*a* and base station 105-*b* may inadvertently schedule UE 115-A for uplink on resources that overlap in time. But UE 115-A may not have the power to transmit both uplinks (e.g., UE 115-A may be power-limited in that it cannot supply the proper or requested power for each transmission). Or UE 115-A may not have enough time to prepare for one of the uplinks (e.g., if the corresponding uplink grant is received in close temporal proximity to the uplink resources scheduled by the other grant). According to the techniques described herein, UE 115-A may resolve the issue by reducing the power of one of the conflicting uplink transmissions or by dropping one of the uplink transmissions altogether. And base station 105-*a* and base station 105-*b* may avoid scheduling such collisions by coordinating uplink grants or traffic (e.g., by communicating via backhaul or X2 interface 220). For example, base station 105-*a* or 210 may transmit an indication of what resources will be used for the uplink grant for the respective RAT of the base station 105-*a* or 210. This indication may be transmitted by either base station (e.g., either base station 105-a or base station 105-b may be the source of the indication). In some cases, an indication of a grant window (e.g., the grant window size, a value corresponding to a grant window) may be exchanged (e.g., via backhaul) between base station 105-a and base station 105-b, which may allow the base station 105-a and 210 to coordinate scheduling of uplink grant resources.

Figure 3:
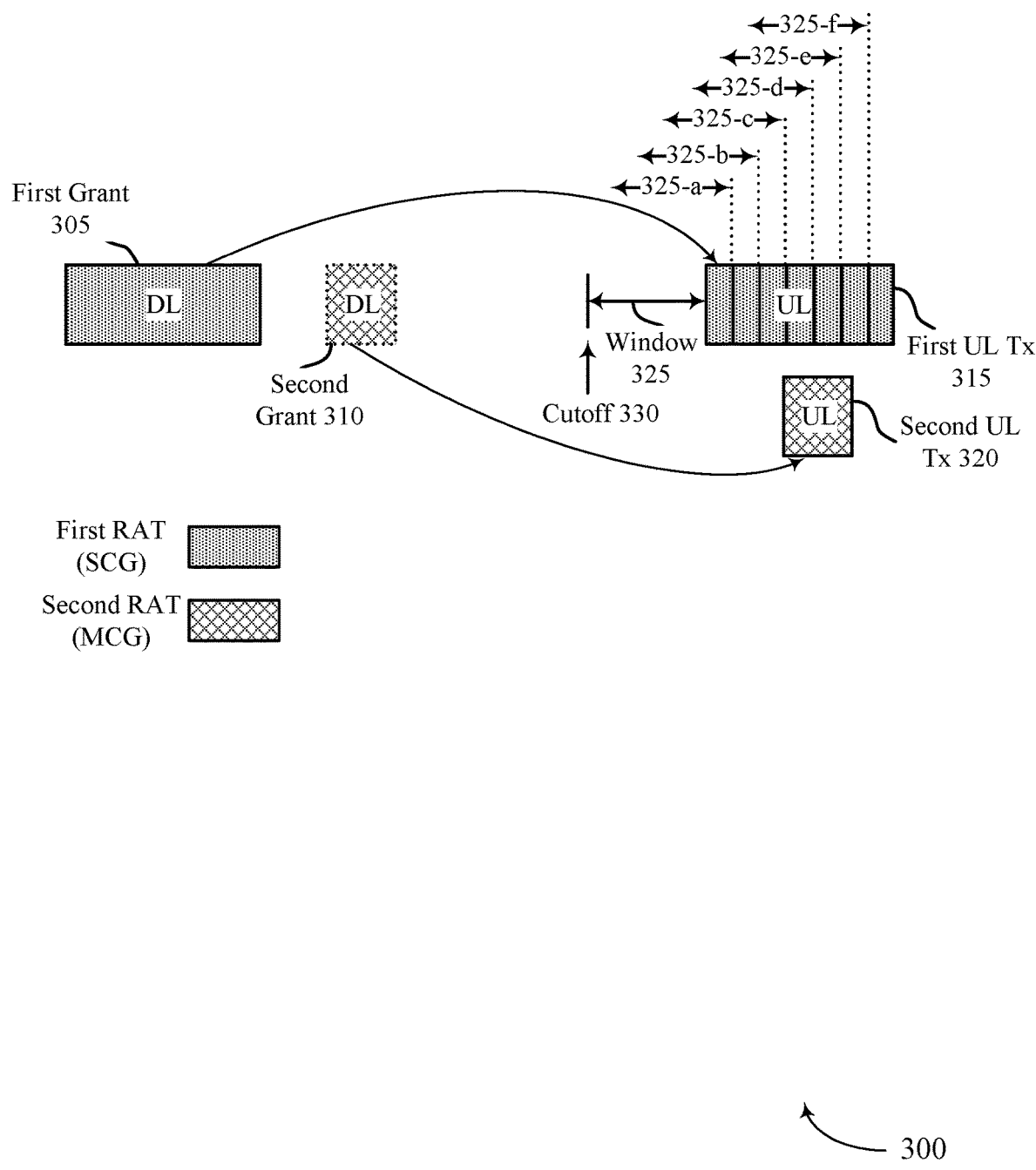
FIGS. 3 through 6 illustrate examples of dual connectivity communications that support dual connectivity transmission techniques in accordance with aspects of the present disclosure.

FIG. 3 illustrates an example of dual-connectivity communications 300 that support dual connectivity transmission techniques in accordance with aspects of the present disclosure. Dual-connectivity communications 300 may be communications between a dual-connectivity UE (e.g., a UE in MR-DC mode) and two base stations (e.g., an anchor base station and a secondary base station) of different RATs.

Dual-connectivity communications 300 may include a first grant 305 from an anchor base station using first RAT and a second grant 310 from a secondary base station using a second RAT. The first grant 305 may be received at a first time and the second grant 310 may be received at a second time different from (e.g., later in time) than the first grant 305. Dual-connectivity communications 300 may also include a first uplink transmission 315 from the anchor base station using the first RAT and a second uplink transmission 320 from the secondary base station using the second RAT. The first grant 305 may schedule the first uplink transmission 315 for a first set of time resources and the second grant may schedule the second uplink transmission for a second set of time resources that at least partially overlaps the first set of time resources.

The first RAT and the second RAT may be different. For example, the first RAT may be LTE and the second RAT may be NR. Or the first RAT may be NR and the second RAT may be LTE. When the first RAT is LTE and the second RAT is NR, the configuration may be referred to as EN-DC. When the first RAT is NR and the second RAT is LTE, the configuration may be referred to as NE-DC.

In EN-DC, LTE cells make up the MCG (and an LTE base station is the anchor base station) while NR cells make up the SCG (which means that a NR base station is the secondary base station). In NE-DC, NR cells make up the MCG (and a NR base station is the anchor base station) while LTE cells make up the SCG (which means that an LTE base station is the secondary base station). According to the techniques describe herein, a UE may prioritize LTE communications over NR communications (e.g., uplink transmissions) when in EN-DC, and may prioritize NR communications over LTE communications when in NE-DC. In some cases, LTE communications may be prioritized over NR communications in NE-DC, transmit power may be reduced or NR communications may be dropped when the NR cells make up the MCG. In some cases, the UE may prioritize NR over LTE every time an uplink collision occurs, and thus reduce the power for LTE uplinks, and in some cases drop the LTE uplinks, regardless of content and timing.

NR communications may be scheduled in units of time referred to as NR TTIs and LTE communications may be scheduled in units of time referred to as LTE TTIs. Thus, the processing timeline for NR communications may be different than the processing timeline for LTE communications. In a scenario referred to as Case 1, the LTE TTIs may be shorter than the NR TTIs. For example, the LTE TTIs may be sTTIs which have shorter processing times than the NR TTIs (e.g., when the LTE sTTI follows n+4 timeline and the UE is only capable of a capability #1 (cap #1) processing timeline for NR). In a scenario referred to as Case 2, the NR TTIs may be shorter than the LTE TTIs. For example, the NR TTIs may have shorter processing times than the LTE TTIs (e.g., when the UE is capable of cap #2 for NR).

A UE may receive the second grant 310 after it receives the first grant 305. The first grant 305 may be included in downlink control information from the anchor base station (e.g., the first grant 305 may be included in a physical downlink control channel (PDCCH), shortened PDCCH (sPDCCH), or evolved PDCCH (ePDCCH)). The first grant 305 may schedule time and frequency resources for the UE to use in an upcoming uplink transmission (e.g., a transmission in a physical uplink shared channel (PUSCH) or shortened PUSCH (sPUSCH)). The second grant 310 may be included in downlink control information from the secondary base station (e.g., the second grant 310 may be included in PDCCH, sPDCCH, or ePDCCH). The second grant 310 may schedule time and frequency resources for the UE to use is an upcoming uplink transmission (e.g., a transmission in a PUSCH or sPUSCH). In some cases, the time resources scheduled by the second grant 310 may overlap at least partially with the time resources scheduled by the first grant 305. Such overlap may be referred to as an uplink collision or conflict.

When an uplink collision occurs, the UE may not have enough power to satisfy both uplinks. This is because the power to be allocated to the second uplink transmission 320 may be already be partially or completely allocated to the first uplink transmission 315. For example, since the UE decodes the first grant 305 before it receives the second grant 310, the UE may allocate power for the first uplink transmission 315 before the UE is aware of the second uplink transmission 320. A UE that cannot satisfy the power requirements for both uplink transmissions is said to be power-limited.

When a UE is power-limited, the UE may determine how to treat each uplink transmission based on the timing of the associated uplink grant. For example, the UE may treat an uplink transmission differently based on when it is received relative to a time window associated with the first set of time resources for first uplink transmission 315 (e.g., based on whether an uplink transmission's corresponding grant is received inside or outside of window 325). For example, the UE may determine the respective transmit powers for the first uplink transmission 315 and the second uplink transmission 320 based on when the second grant 310 is received relative to the window 325.

The window 325 may be determined, defined, or selected by the UE and may be (or represent) the amount of time (e.g., the minimum amount of time) for the UE to change the power for, or cancel, first uplink transmission 315. The duration of window 325 may be a UE capability or a function of the UE's capabilities (e.g., based on the UE's ability to calculate a new power for an uplink transmission) and may be different for different types of uplink transmissions (e.g., different for PUSCH transmissions compared to physical uplink control channel (PUCCH) transmissions). In some cases, the UE may report the duration of window 325 (e.g., in terms of time (in ms), slots, or symbols, such as symbols based on NR numerology) to one or both of its serving base stations (e.g., for coordination purposes).

For Case 1 and 2, if the second grant 310 is received before the start of window 325 (referred to as cutoff time 330), the UE may prioritize second uplink transmission 320 (e.g., the uplink transmission for the MCG) by allocating it its assigned power and either canceling (or "dropping") first uplink transmission 315 or reducing its transmit power. Canceling an uplink transmission may include determining that it's transmit power is zero. In some cases, reducing the transmit power for the first uplink transmission 315 includes determining a transmit power for the first uplink transmission 315 prior to receiving the second grant 310, and adjusting the transmit power for the first uplink transmission after receiving the second grant 310.

The UE may determine to cancel the first uplink transmission 315 or partially reduce its power based on whether there is enough remaining power to transmit the first uplink transmission 315 (e.g., based on whether there is enough power to satisfy the minimum requirement for first uplink transmission 315). For instance, if there is enough remaining power, the UE may opt to reduce the power for first uplink transmission 315 rather than cancel it. Or the UE may make the decision based on its processing availability (e.g., the UE may cancel first uplink transmission 315 when it determines that partially reducing its power would consume too many processing resources). An uplink's transmission power is said to be reduced or scaled-down if it is less than the transmission power originally assigned or allocated to it (e.g., by a downlink grant or by the UE).

In some cases, the UE may not prioritize the uplink transmissions based on their association with the MCG but rather prioritize the uplink transmissions based on their content (e.g., based on the time-delay sensitivity of the content). For example, the UE may prioritize URLLC traffic, HARQ content (e.g., an acknowledgement (ACK) or negative acknowledgement (NACK)), and DMRSs over other types of data. For example, the UE may identify a traffic type for an uplink transmission based on information contained within received downlink control information (DCI) of a PDCCH that includes the grant or based on a radio network temporary identifier (RNTI) associated with the uplink grant.

In some cases, the UE may prioritize the uplink transmissions based on repetition (in which content or transport blocks (TB s) are transmitted multiple times). For example, the UE may prioritize the uplink transmission that is assigned repetition, or the number of assigned repetitions for an uplink transmission is greater than a predefined threshold (e.g., the number of assigned repetitions for an uplink transmission is greater than one), or associated with downlink content that has been the subject of repetition (because such content needs high reliability and low latency). Or the UE may prioritize data for which the UE is operating according to repetition transmission mode. Thus, the UE may reduce the power for second uplink transmission 320 (and transmit first uplink transmission 315 at its full assigned power) even though it is the uplink for the MCG (and even though its corresponding second grant 310 was received before the cutoff time 330).

For Case 1, if the second grant 310 is received after cutoff time 330, the UE may wish to prioritize second uplink transmission 320 (e.g., the MCG uplink) but may not be able to reduce the power for first uplink transmission 315 in time to transmit both uplinks. For example, the UE may not have enough time to calculate the new power for first uplink transmission 315. And the UE may not be able divert enough processing resources to prepare second uplink transmission 320. In such cases, the UE may opt to transmit first uplink transmission 315 at full power and drop or scale down the transmit power for the second uplink transmission 320 (even though it is prioritized higher than first uplink transmission 315).

For Case 2, if the second grant 310 is received after cutoff time 330, the UE may handle the uplink conflict in one of at least three ways. First, the UE may automatically drop first uplink transmission 315. Second, the UE may reduce the power for second uplink transmission 320 if the UE determines that it has enough time to do so. Third, the UE may reduce the power for second uplink transmission 320 based on the content of first uplink transmission 315 (e.g., the UE may reduce the power for second uplink transmission 320 if first uplink transmission 315 conveys HARQ content or DMRS).

Although the window 325 is shown defined relative to the beginning of the first uplink transmission 315, the window 325 may be defined relative to the beginning of a symbol within the first uplink transmission 315. For example, the window 325 could end at the beginning of the second symbol of first uplink transmission 315, like window 325-a. Or the window could end at the beginning of the third symbol of first uplink transmission 315, like window 325-b. And so on and so forth. Such definition is possible when the UE is able to control the power for an uplink transmission at the symbol-level (e.g., the UE is able to control the power for each symbol independently).

Figure 4:
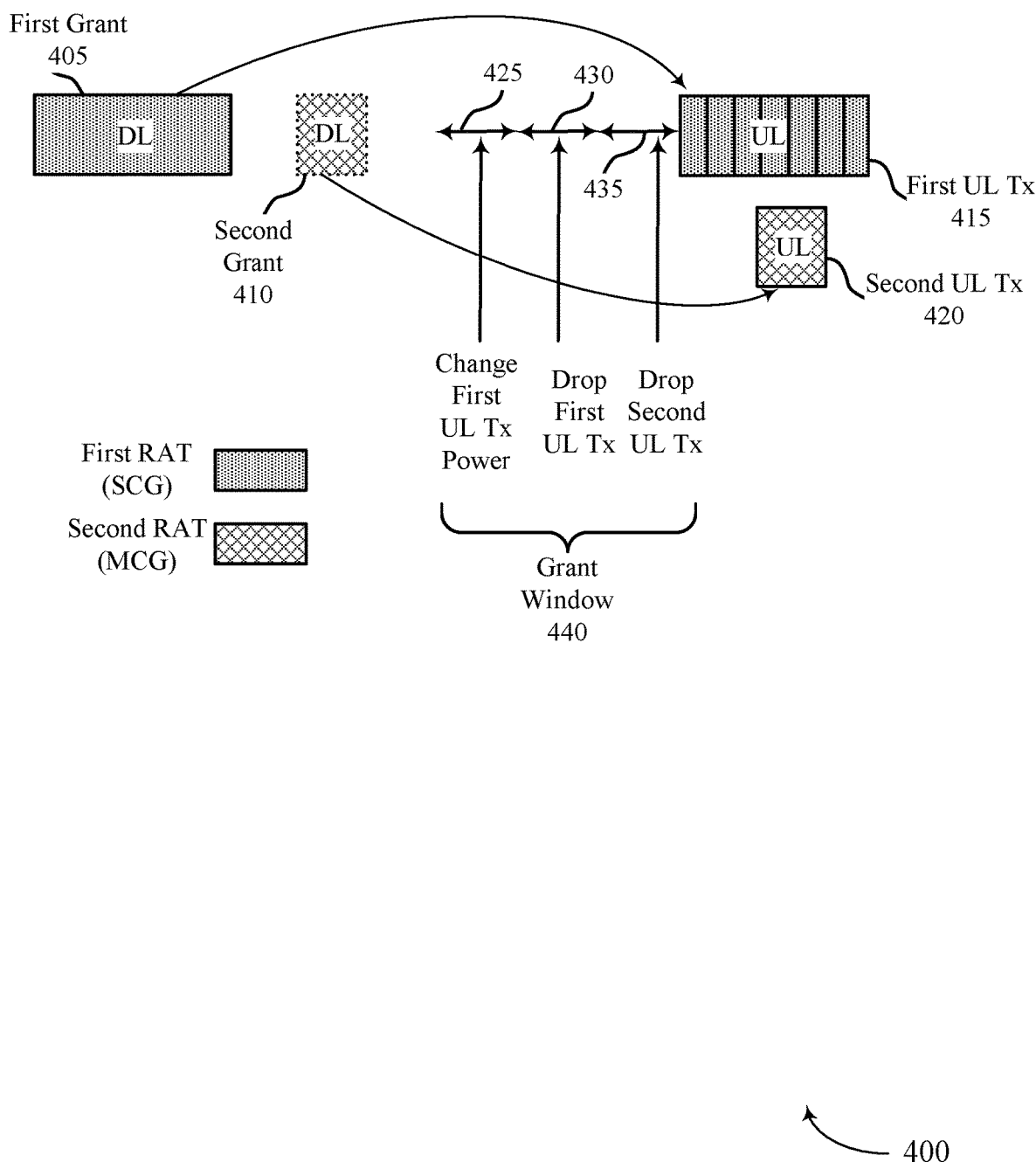

FIG. 4 illustrates an example of dual-connectivity communications 400 that support dual connectivity transmission techniques in accordance with aspects of the present disclosure. Dual-connectivity communications 400 may be communications between a dual-connectivity UE (e.g., a UE in MR-DC mode) and two base stations of different RATs. Dual-connectivity communications 400 may represent EN-DC communications or NE-DC communications. Dual-connectivity communications 400 may include a first grant 405 and a corresponding first uplink transmission 415. Dual-connectivity communications 400 may also include a second grant 410 and a corresponding second uplink transmission 420.

For Case 1 and Case 2, if the second grant 410 is received before the window 425 (which may also be referred to as a first period of the grant window), the UE may transmit both the first uplink transmission 415 and the second uplink transmission 420 at their full respective powers (e.g., at the power each transmission was originally assigned or allocated). Window 425 may represent the period of time during which the UE is capable of changing power for first uplink transmission 415. Window 425 may be a function of the UE's capabilities, and may be reported to one or both of the base stations serving the UE (e.g., the anchor base station or the secondary base station).

For Case 1 and Case 2, if the second grant 410 is received during window 425, the UE may split (e.g., divide or apportion) its total transmit power between the first uplink transmission 415 and the second uplink transmission 420. For example, the UE may split the total transmit power by reducing the power for the first uplink transmission 415 (e.g., based on the power assigned to the second uplink transmission 420). If the second grant 410 is received during window 430 (which may also be referred to as a second period of the grant window), the UE may determine the transmit power for the first uplink transmission 415 to be zero. For example, the UE may drop the first uplink transmission 415 (e.g., due to processing limitations). Window 430 may represent the period of time during which the UE is capable of dropping first uplink transmission 415, but not reducing its power. Window 430 may be a function of the UE's capabilities, and may be reported to one or both of the base stations serving the UE. Although described as dropping the entire first uplink transmission 415 (e.g., the entire slot), in some cases the UE may drop a portion of the first uplink transmission 415. For instance, the UE may drop the overlapping symbols of the first uplink transmission 415 (e.g., the symbols that are scheduled for both uplink transmissions).

If the second grant 410 is received during window 435 (which may also be referred to as a third period of the grant window), the UE may drop second uplink transmission 420 (e.g., due to processing limitations). Window 435 may represent the period of time during which the UE is capable of dropping second uplink transmission 420, but not first uplink transmission 415. Window 435 may be a function of the UE's capabilities, and may be reported to one or both of the base stations serving the UE.

Each of the windows described herein may be or represent a period of time and may defined, selected, or determined by the UE. In some cases, windows 425, 430, and 435 may define operational regions within window 325. That is, a window may be divided into operational regions 425, 430, and 435. Or windows 425, 430, and 435 may be used in lieu of window 325. Windows 425, 430, and 435 may have the same duration or different durations.

In some cases, uplink conflicts may be avoided by base station coordination. For example, the UE may send indications of one or more of its windows to one or both serving base stations. In some cases, the indications may include information related to the size of the windows. If the UE sends the window information to one of the base stations, that base station may relay the window information to the other base station over the X2 interface. The base station which receives the window information from the UE may be dependent upon which RAT the window is associated with. For example, in the case where an LTE RAT is the anchor RAT, the UE may transmit the window information to the associated LTE base station. The LTE base station may then transmit the window information to an NR base station. Once both base stations are aware of the UEs window lengths, the base stations may coordinate downlink transmissions and uplink grants based on the window length(s). For example, the base stations may avoid transmitting downlink grants during the windows. The coordination between the base stations may be via a backhaul link between the base stations. This may allow for dynamic coordination where the differing base station may respond to the changing RATs and windows of one or more UEs, and may reduce uplink conflicts.

In one example of base station coordination, the anchor base station may receive an indication of a grant window value from the UE or the secondary base station. The grant window value may be a value that indicates the duration of window 325, 425, 430, or 435. The grant window value may represent the period of time before an uplink transmission during which the UE may transmit two uplinks over the same time resources at full power. The indication of the grant window value may be an explicit indication of the value (e.g., in terms of ms, symbols, or slots) or an implicit indication of the grant window value (e.g., an indication of the UE's capabilities). The anchor base station may look up a grant window value for the UE based on the UE's capabilities.

The anchor base station may identify a first grant (e.g., first grant 405) for a first set of time resources allocated to the UE for a first uplink transmission via the second RAT (e.g., the anchor base station may identify the time resources for the first uplink transmission 415). For example, the secondary base station may communicate to the anchor base station its plans to transmit an uplink grant. The anchor base station may determine a grant window for the UE (e.g., grant window 440) based on the grant window value. The grant window may be a period of time defined relative to (e.g., measured from) the beginning of an uplink transmission (or beginning of an uplink transmission symbol). For example, the grant window may be a period of time immediately preceding an uplink transmission. In FIG. 4, the grant window 440 may be the period of time that begins at the start of window 425 and ends at the end of window 435 (or ends at the beginning of the first slot of first uplink transmission 415). Thus, the grant window may be determined with respect to the first set of resources (that have been allocated to the first uplink transmission 415).

After determining the grant window, the anchor base station may determine a set of downlink resources (e.g., time and frequency resources) for transmission of a second grant (e.g., second grant 410) to the UE. The downlink resources may be time resources that are based on the grant window. Upon selecting the set of downlink resources, the anchor base station may transmit the second grant to the UE via the set of downlink resources. For example, the anchor base station may transmit the second grant 410 so that it is received by the UE before the grant window. Or the anchor base station may assign new time resources to the uplink transmission corresponding to the second grant. Although described with reference to the anchor base station, the coordination techniques described herein may be implemented by the secondary base station.

As discussed above, the grant window 440 may be defined at the symbol level (e.g., the grant window may be defined relative to a symbol within the first uplink transmission 415, so that the grant window 440 at least partially overlaps the first set of time resources reserved for the first uplink transmission 415). Given the symbol-level granularity of the grant window, when the UE divides the grant window into operational regions, the secondary base station may ensure that the second uplink transmission 420 is not dropped by transmitting the second grant 410 prior to the beginning of the grant window for each symbol.

For NE-DC, the base stations may ensure that the second uplink transmission 420 is transmitted by exchanging a set of timing value (e.g., K0/K1/K2 values). For example, the anchor base station may send one or more of its K0/K1/K2 values to the secondary base station or the secondary base station may send one or more of its K0/K1/K2 values to the anchor base station. One or both of the base stations may select new K0, K1, or K2 values based on the window for the UE (e.g., the sTTI processing timeline), which may prevent or mitigate uplink collisions.

In some cases, a base station may take the timing advance (TA) of the UE into account when coordinating its grants and uplink traffic. Because the TA for a UE may vary with the RAT, the UE may report its TA (e.g., a timing advance value) for each RAT to the associated serving base station. The UE may additionally include its TA in the W report (e.g., the report of the UE window) to the base station. The timing advance value may indicate or represent the propagation delay between the UE and a base station. The base station may add the TA value to the grant window value and schedule upcoming grants based on the sum. If the UE does not report its TA, the base station may follow the same process but using a given TA value (e.g., a maximum TA value) expected for the UE.

Figure 5:
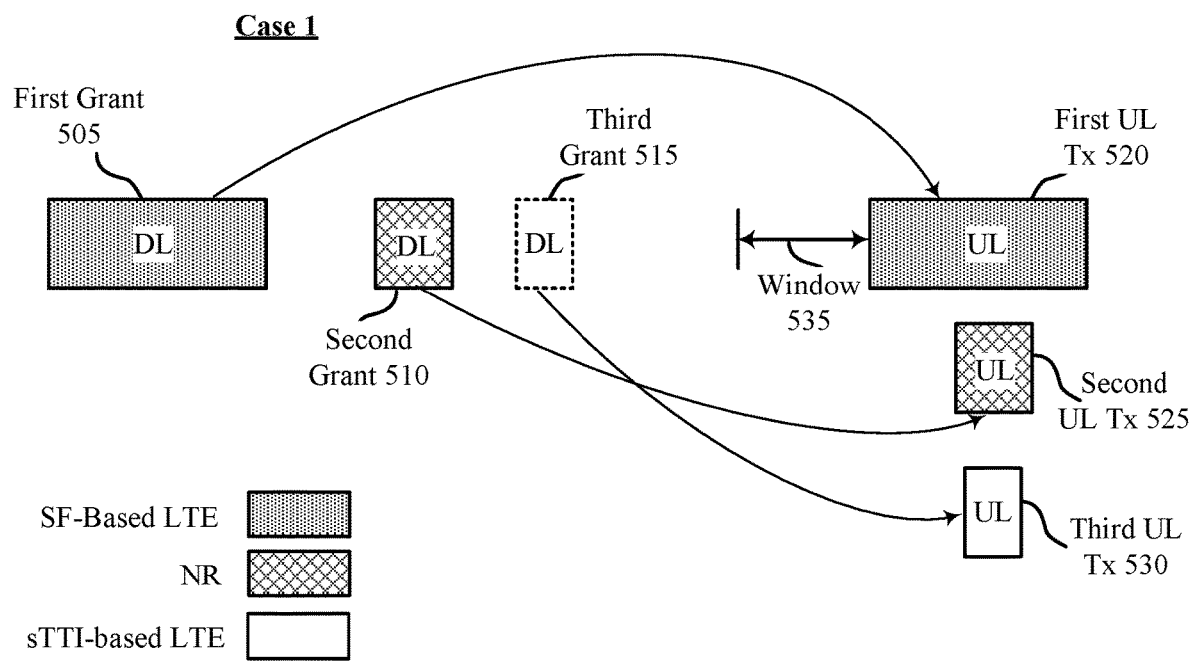

FIG. 5 illustrates an example of dual-connectivity communications 500 that support dual connectivity transmission techniques in accordance with aspects of the present disclosure. Dual-connectivity communications 500 may be communications between a dual-connectivity UE and two base stations (e.g., an anchor base station and a secondary base station) of different RATs. Dual-connectivity communications 500 may represent EN-DC communications or NE-DC communications. Dual-connectivity communications 500 may include a first grant 505 and a corresponding first uplink transmission 520, which are subframe-based LTE transmissions. Dual-connectivity communications 500 may also include a second grant 510 and a corresponding second uplink transmission 525, which are NR transmissions. Communications may also include a third grant 515 and a corresponding third uplink transmission 530, which are sTTI-based LTE transmissions. Dual-connectivity communications 500 represent Case 1 communications because the LTE sTTIs are shorter than the NR TTIs.

Each of the grants may occur before window 535, or the third grant 515 may arrive during window 535. Each grant may schedule the UE for an upcoming uplink, and all of the uplinks may overlap at least partially in time. When this occurs, the UE may first determine if it is power limited with respect to the two LTE uplink transmissions (e.g., first uplink transmission 520 and third uplink transmission 530). If no, the UE may prioritize and treat all three uplink transmissions according to the techniques described with reference to FIGS. 3 and 4. If yes, the UE may first cancel one of the two LTE uplink transmissions (e.g., based on a predefined prioritization hierarchy or set of priorities, such as LTE Release 15 priorities), then prioritize and treat the remaining LTE transmission and NR transmission as described with reference to FIGS. 3 and 4. For example, the UE may prioritize LTE over NR for EN-DC, and the UE may prioritize NR over LTE for NE-DC.

Figure 6:
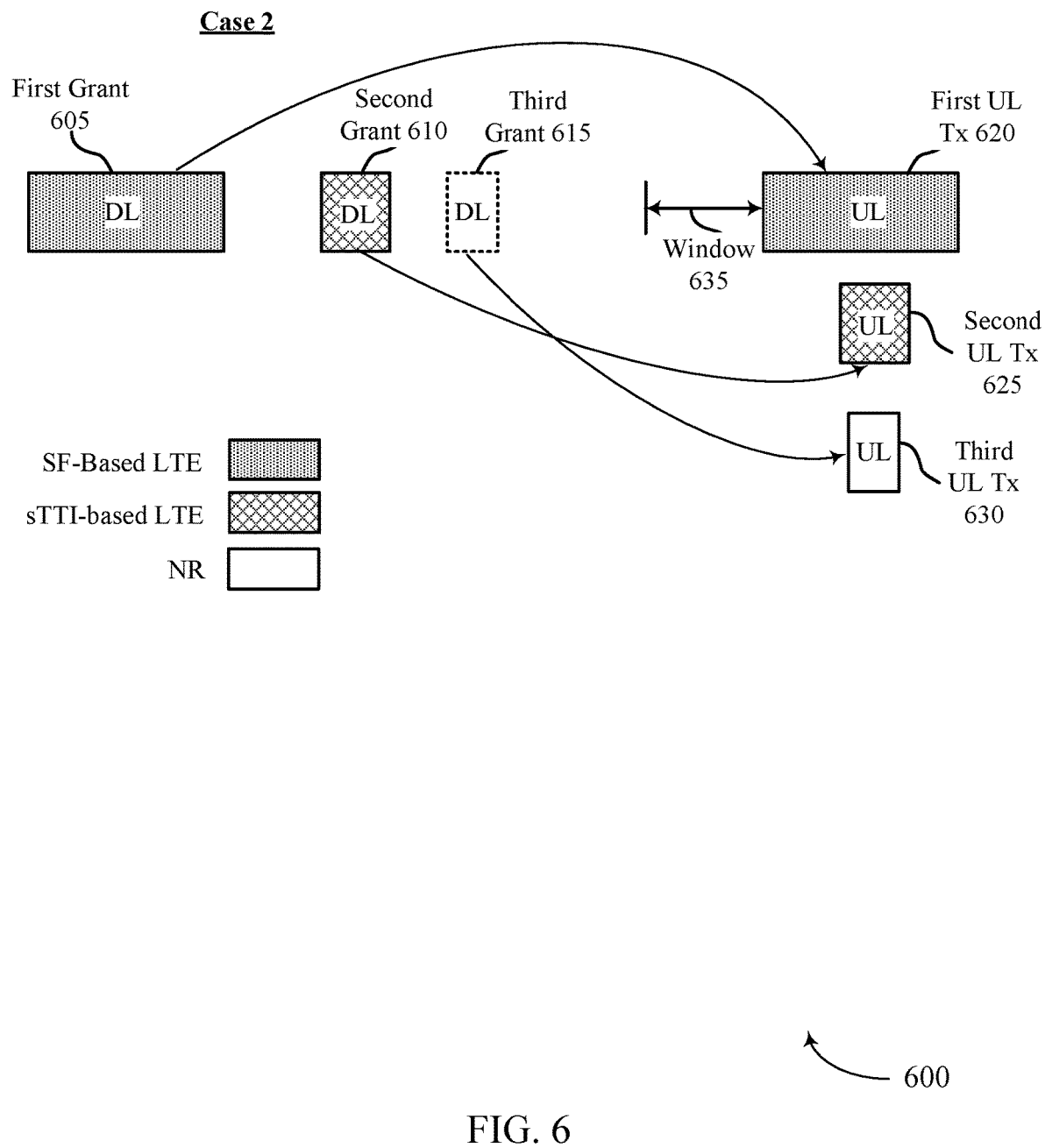

FIG. 6 illustrates an example of dual-connectivity communications 600 that support dual connectivity transmission techniques in accordance with aspects of the present disclosure. Dual-connectivity communications 600 may be communications between a dual-connectivity UE and two base stations that operate according to different RATs. Dual-connectivity communications 600 may represent EN-DC communications or NE-DC communications. Dual-connectivity communications 600 may include a first grant 605 and a corresponding first uplink transmission 620, which are subframe-based LTE transmissions. Dual-connectivity communications 600 may also include a second grant 610 and a corresponding second uplink transmission 625, which are sTTI-based LTE transmissions. Dual-connectivity communications 600 may also include a third grant 615 and a corresponding third uplink transmission 630, which are NR transmissions. Dual-connectivity communications 600 may represent Case 2 communications because the LTE sTTIs are longer than the NR TTIs.

Each of the uplink grants may occur before the window 635, or the third grant 615 may be received during window 635. Each uplink grant may schedule the UE for an upcoming uplink, and all of the uplinks may overlap at least partially in time. When this occurs, the UE may resolve the three-way conflict in one of at least two ways. First, the UE may opt to drop the third uplink transmission 630, regardless of timing or content parameters. Second, the UE may, upon determining that it is power limited with respect to the two LTE transmissions, drop one of the LTE transmissions and then prioritize and treat the remaining two uplink transmissions according to the techniques described with reference to FIGS. 3 and 4. For example, the UE may prioritize LTE over NR for EN-DC, and the UE may prioritize NR over LTE for NE-DC.

Figure 7:
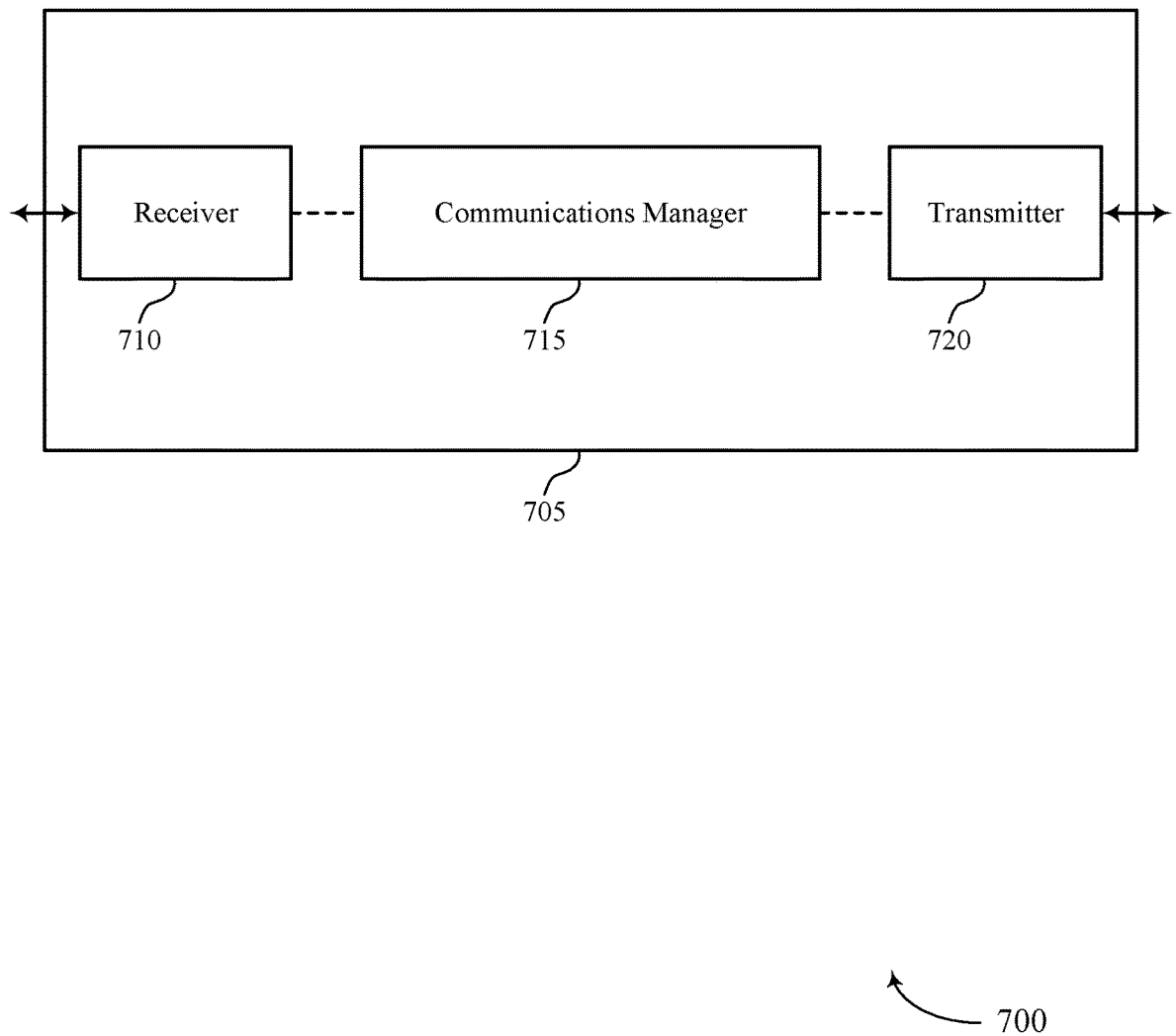
FIGS. 7 and 8 show block diagrams of devices that support dual connectivity transmission techniques in accordance with aspects of the present disclosure.

FIG. 7 shows a block diagram 700 of a device 705 that supports dual connectivity transmission techniques in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication (e.g., coupled) with one another (e.g., via one or more buses).

The receiver 710 may receive information such as packets, user data, or control information associated with various information channels (e.g., control channels, data channels, and information related to dual connectivity transmission techniques, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive (e.g., via the receiver 710), from an anchor base station at a first time, a first grant for a first uplink transmission over a first set of time resources. The first uplink transmission may be via a first RAT. The communications manager 715 may also receive (e.g., via the receiver 710), from a secondary base station at a second time, a second grant for a second uplink transmission over a second set of time resources that at least partially overlaps the first set of time resources. The second uplink transmission may be via a second RAT. The communications manager 715 may determine transmit power for the first and second uplink transmissions based on the second time and a grant window associated with the first set of time resources. And the communications manager 715 may transmit one or both of the first uplink transmission and the second uplink transmission via at least a portion of the first set of time resources based on determining the transmit power. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated (e.g., placed in relation to one another such as by sharing the same component or device) with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow the device 705 to more efficiently recognize its power limitations and select transmit powers for uplink transmissions based on available power. For example, device 705 may select a transmit power for an uplink transmission that is reduced from the transmit power the uplink transmission was originally assigned or allocated. Additionally or alternatively, device 705 may enable the device 705 to coordinate with an additional device to avoid, prevent, or mitigate the scheduling of uplink transmissions over coincident time resources (e.g., based on a TA value of the UE).

Based on implementing the power selection and coordination techniques as described herein, a processor of a UE 115 (e.g., controlling the receiver 710, the transmitter 720, or the transceiver 1020 as described with reference to FIG. 10) may support improvements in the coverage area for UE 115 and may increase the data rate of uplink and downlink transmissions as the UE 115 may select and split power of its transmissions and allow communication coordination between the base stations serving UE 115.

Figure 8:
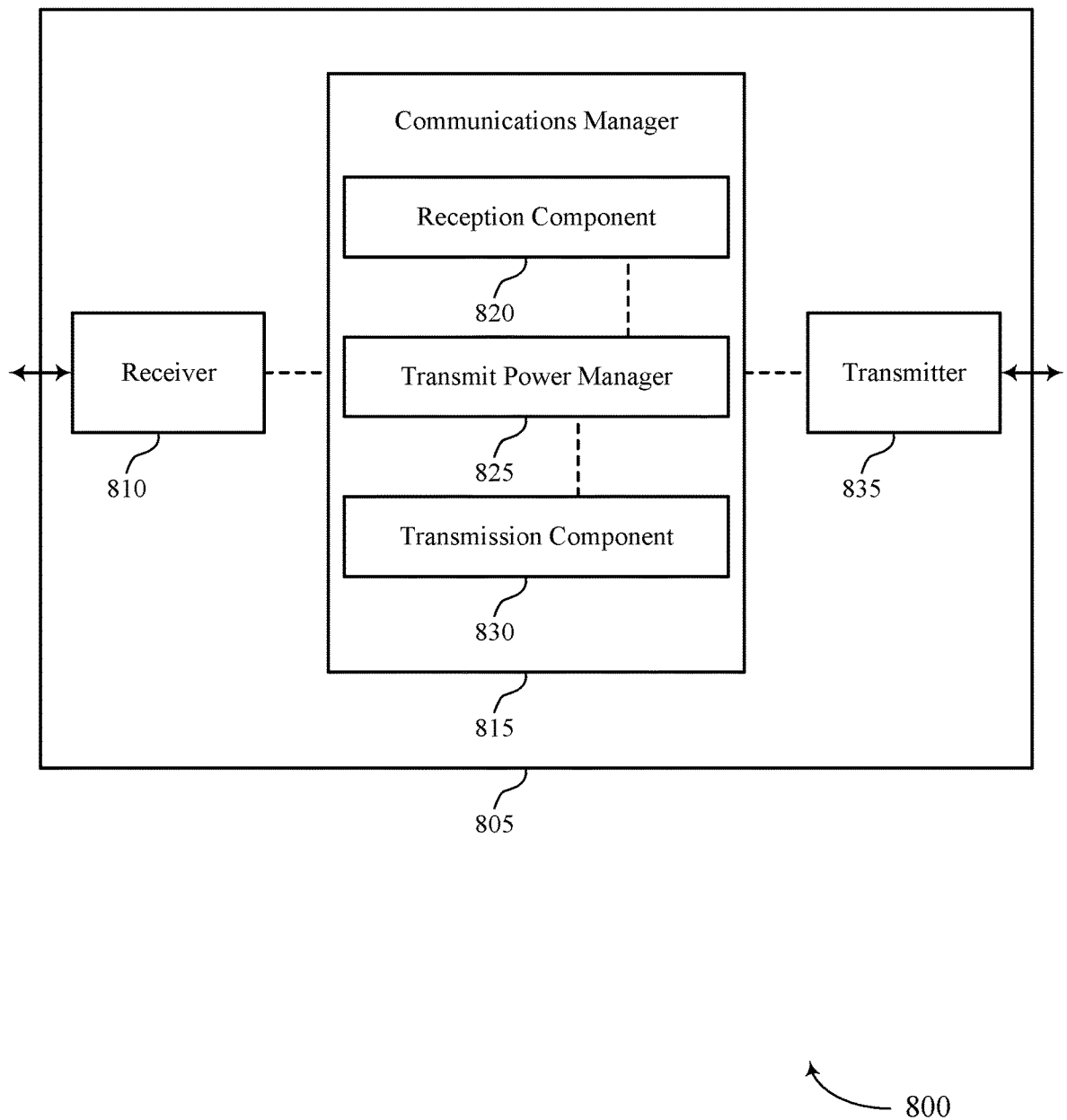

FIG. 8 shows a block diagram 800 of a device 805 that supports dual connectivity transmission techniques in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication (e.g., coupled) with one another (e.g., via one or more buses).

The receiver 810 may receive information such as packets, user data, or control information associated with various information channels (e.g., control channels, grants, data channels, and information related to dual connectivity transmission techniques, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a reception component 820, a transmit power manager 825, and a transmission component 830. The communications manager 815 may be an example of aspects of the communications manager 1010 described herein.

The reception component 820 may receive, from an anchor base station at a first time, a first grant for a first uplink transmission over a first set of time resources. The first uplink transmission may be via a first RAT. The reception component 820 may also receive, from a secondary base station at a second time, a second grant for a second uplink transmission over a second set of time resources that at least partially overlaps the first set of time resources. The second uplink transmission may be via a second RAT.

The transmit power manager 825 may determine transmit power for the first and second uplink transmissions based on the second time and a grant window associated with the first set of time resources.

The transmission component 830 may transmit one or both of the first uplink transmission and the second uplink transmission via at least a portion of the first set of time resources based on determining the transmit power. In some cases, the transmission component 830 may be part of the transmitter 835.

The transmitter 835 may transmit signals generated by other components of the device 805. In some examples, the transmitter 835 may be collocated (e.g., placed in relation to one another such as by sharing the same component or device) with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
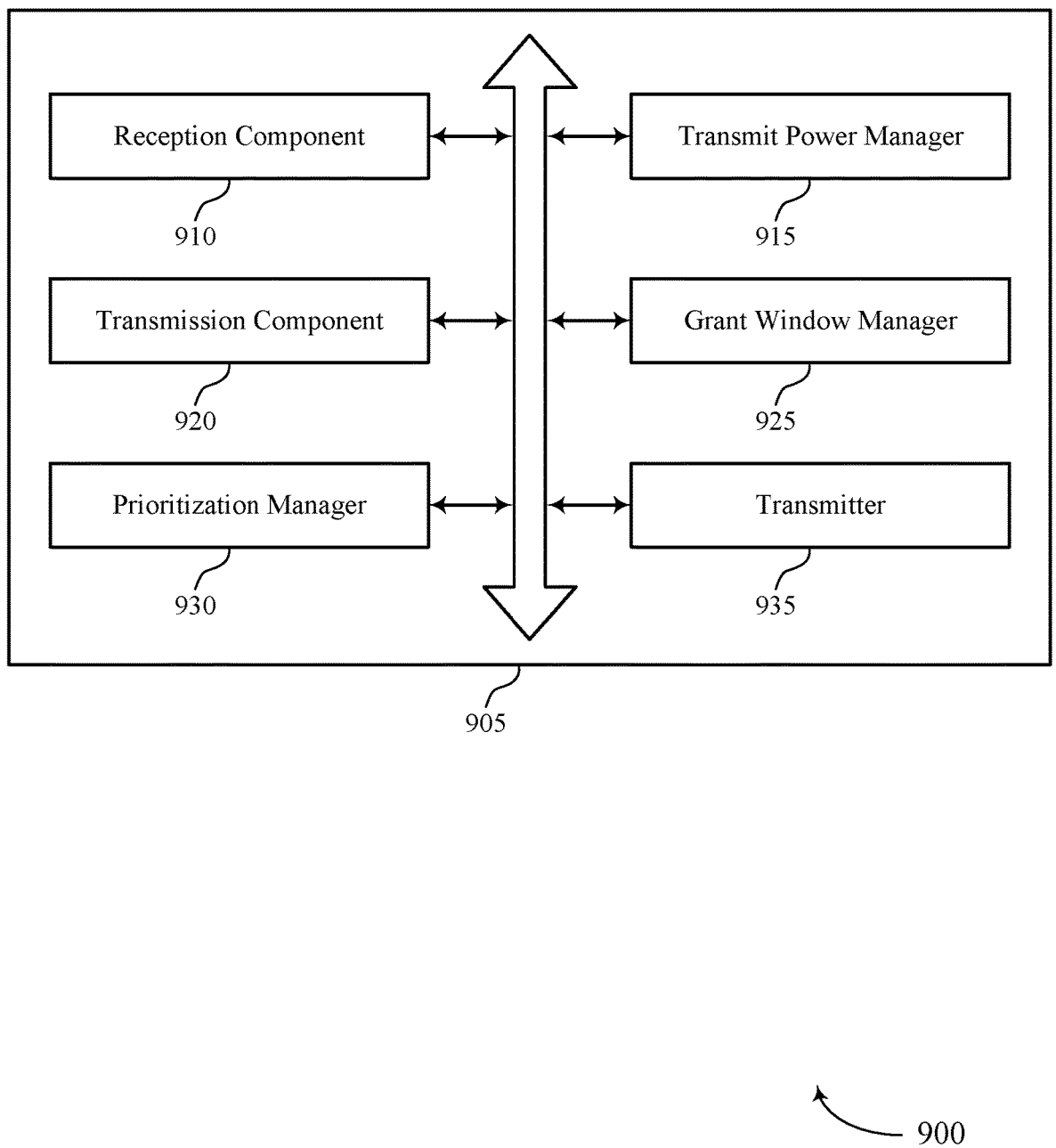
FIG. 9 shows a block diagram of a communications manager that supports dual connectivity transmission techniques in accordance with aspects of the present disclosure.

FIG. 9 shows a block diagram 900 of a communications manager 905 that supports dual connectivity transmission techniques in accordance with aspects of the present disclosure. The communications manager 905 may be an example of aspects of a communications manager 715, a communications manager 815, or a communications manager 1010 described herein. The communications manager 905 may include a reception component 910, a transmit power manager 915, a transmission component 920, a grant window manager 925, a prioritization manager 930, and a transmitter 935. Each of these modules may communicate, directly or indirectly, with one another (e.g., via one or more buses).

The reception component 910 may receive, from an anchor base station at a first time, a first grant for a first uplink transmission over a first set of time resources. The first grant and the first uplink transmission may be associated with a first RAT. In some examples, the reception component 910 may receive, from a secondary base station at a second time, a second grant for a second uplink transmission over a second set of time resources that at least partially overlaps the first set of time resources. The second grant and the second uplink transmission may be associated with a second RAT. In some examples, the reception component 910 may receive, at a third time, a third grant for a third uplink transmission over a third set of time resources that at least partially overlaps the first set of time resources. The third uplink transmission may be associated with the first RAT and may be a subframe-based TTI. In some cases, the first RAT includes one of a NR RAT or an LTE RAT and the second RAT includes the other of the NR RAT or the LTE RAT.

The transmit power manager 915 may determine transmit power for the first and second uplink transmissions based on the second time and a grant window associated with the first set of time resources. In some examples, the transmit power manager 915 may split a total transmit power of the UE between the first uplink transmission and the second uplink transmission. In some examples, the transmit power manager 915 may determine the transmit power for the first uplink transmission to be zero over a subset of the second set of time resources that overlap the first set of time resources. In some examples, the transmit power manager 915 may determine whether to drop the first uplink transmission or the second uplink transmission based on the prioritizing. In some cases, the transmit power is determined to be zero for the dropped first uplink transmission or the dropped second uplink transmission. Thus, in some examples, the transmit power manager 915 may determine the transmit power for the second uplink transmission to be zero.

In some examples, the transmit power manager 915 may determine to drop the first uplink transmission, the second uplink transmission, or the third uplink transmission based at least in part on the set of priorities. In some examples, the transmit power manager 915 may determine transmit power for all undropped transmissions (e.g., uplink transmissions with non-zero transmit power, or uplink transmissions that the UE has decided not to cancel) based on a total transmit power for the UE.

In some examples, the transmit power manager 915 may determine transmit power for the first uplink transmission prior to receiving the second grant. In some examples, the transmit power manager 915 may adjust transmit power for the first uplink transmission after receiving the second grant.

In some cases, the subset of the second set of time resources includes a set of overlapping symbols or slots. In some cases, the grant window at least partially overlaps the first set of time resources. In such cases, the transmit power for the first uplink transmission and the second uplink transmission may be determined on a per-symbol basis based on the grant window at least partially overlapping the first set of time resources. In some cases, the grant window is defined on a per-symbol basis for one or more symbols of the first set of time resources.

The transmission component 920 may transmit one or both of the first uplink transmission and the second uplink transmission via at least a portion of the first set of time resources based on determining the transmit power. In some examples, the transmission component 920 may transmit the second uplink transmission via the second set of time resources. In some examples, the transmission component 920 may transmit the first uplink transmission via the first set of time resources. In some examples, the transmission component 920 may transmit, to at least one of the anchor base station or the secondary base station, an indication of the grant window. In some cases, the first uplink transmission is associated with a processing timeline different from the second uplink transmission.

The grant window manager 925 may determine the grant window with respect to the first set of time resources based on a capability of the UE. In some examples, the grant window manager 925 may determine that the second grant is received before a beginning of the grant window or during a first period of the grant window. In some examples, the grant window manager 925 may determine that the second grant is received within a second period of the grant window. In some examples, the grant window manager 925 may determine that the second grant is received within a third period of the grant window. The first period may occur prior in time than the second period, and the second period may occur prior in time than the third period. Put another way, the third period may occur later in time than the second period, and the second period may occur later in time than the first period. The first, second, and third periods may be immediately adjacent to one another in the time domain.

The prioritization manager 930 may prioritize the first uplink transmission and the second uplink transmission based on a traffic type associated with the first uplink transmission and a traffic type associated with the second uplink transmission. In some cases, the traffic type includes one of ACK information, NACK information, a DMRS, or URLLC. In some cases, the UE is operating according to a repetition transmitting mode. In some cases, the prioritization is based on the repetition transmitting mode.

The transmitter 935 may include a timing advance value with the indication of the grant window.

Figure 10:
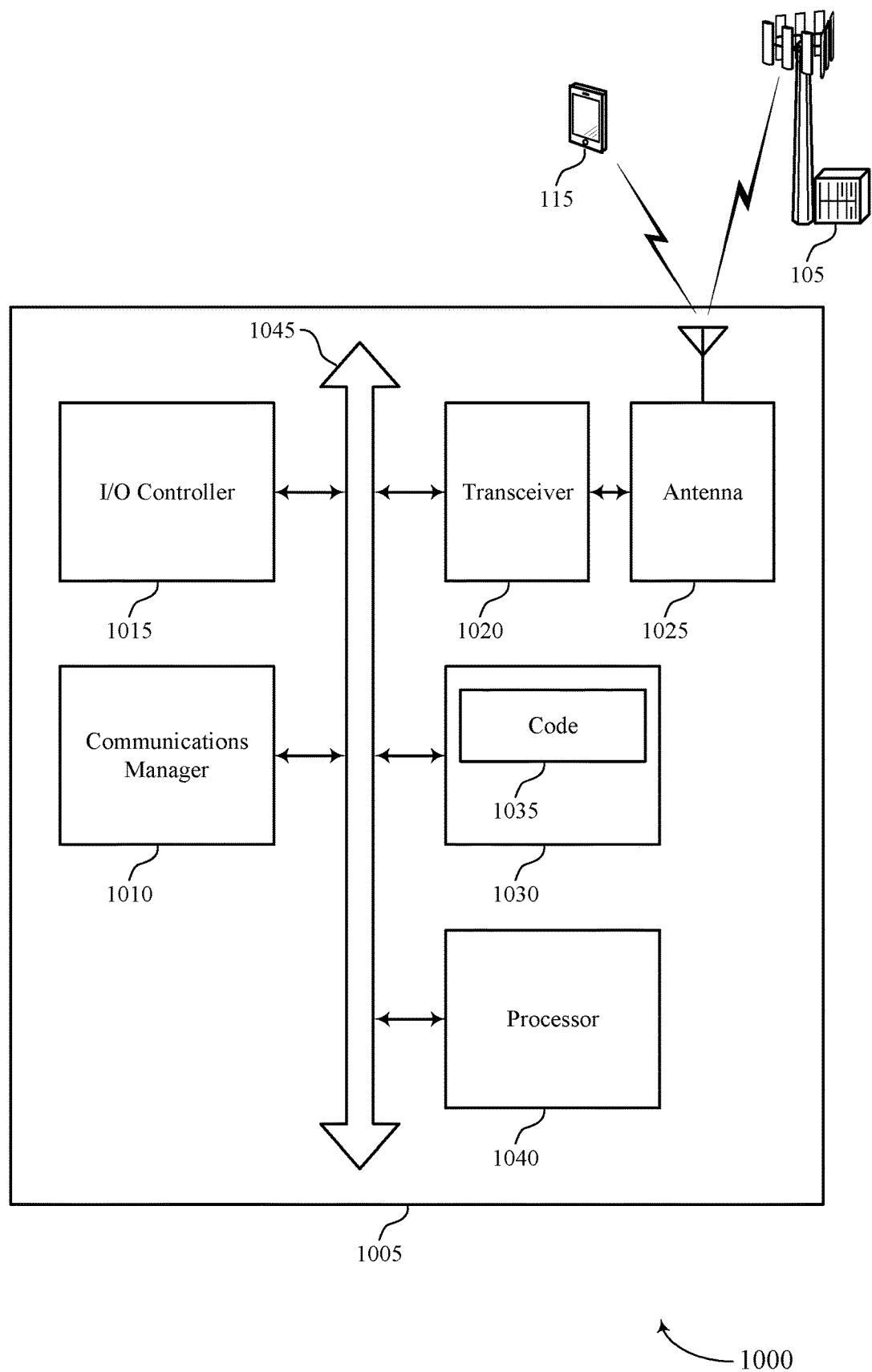
FIG. 10 shows a diagram of a system including a device that supports dual connectivity transmission techniques in accordance with aspects of the present disclosure.

FIG. 10 shows a diagram of a system 1000 including a device 1005 that supports dual connectivity transmission techniques in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be coupled via one or more buses (e.g., bus 1045).

The communications manager 1010 may receive, from an anchor base station at a first time, a first grant for a first uplink transmission over a first set of time resources. The first uplink transmission may be associated with a first RAT. The communications manager 1010 may receive, from a secondary base station at a second time, a second grant for a second uplink transmission over a second set of time resources that at least partially overlaps the first set of time resources. The second uplink transmission may be associated via a second RAT. The communications manager 1010 may determine transmit power for the first and second uplink transmissions based on the second time and a grant window associated with the first set of time resources. And the communications manager 1010 may transmit one or both of the first uplink transmission and the second uplink transmission via at least a portion of the first set of time resources based on determining the transmit power.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dual connectivity transmission techniques).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
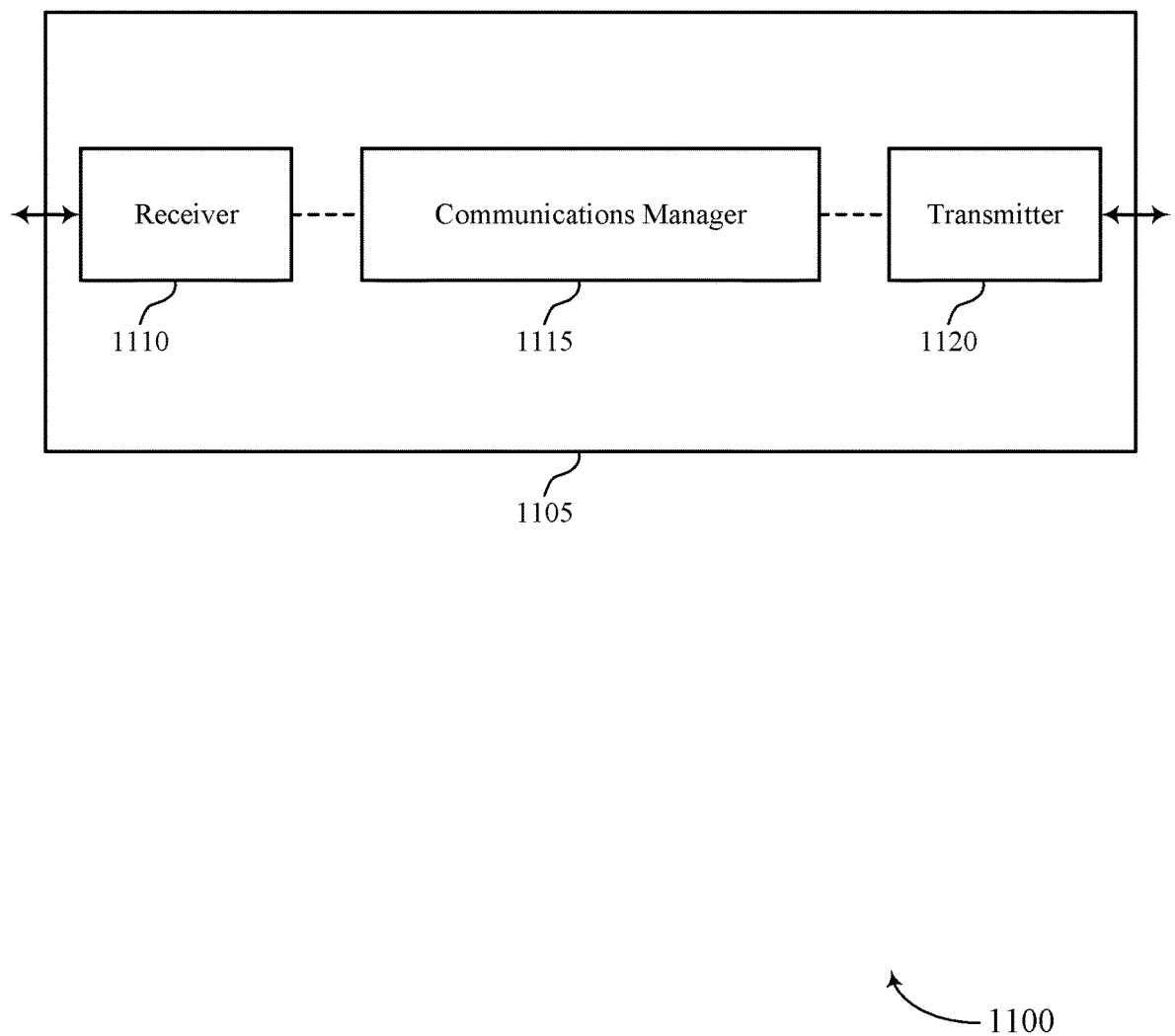
FIGS. 11 and 12 show block diagrams of devices that support dual connectivity transmission techniques in accordance with aspects of the present disclosure.

FIG. 11 shows a block diagram 1100 of a device 1105 that supports dual connectivity transmission techniques in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication (e.g., coupled) with one another (e.g., via one or more buses).

The receiver 1110 may receive information such as packets, user data, or control information associated with various information channels (e.g., control channels, data channels, and information related to dual connectivity transmission techniques, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive an indication of a grant window value from a UE operating in dual connectivity mode. The grant window value may be based on a capability of the UE. The communications manager 1115 may identify a first grant for a first set of time resources allocated to the UE for a first uplink transmission via a first RAT. The communications manager 1115 may determine a grant window for the UE based on the indication of the grant window value. The grant window may be determined with respect to the first set of time resources. The communications manager 1115 may determine a set of downlink resources for transmission of a second grant to the UE based on the grant window. The second grant may indicate a second set of time resources allocated to the UE for a second uplink transmission via a second RAT. The communications manager 1115 may transmit the second grant to the UE via the set of downlink resources. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
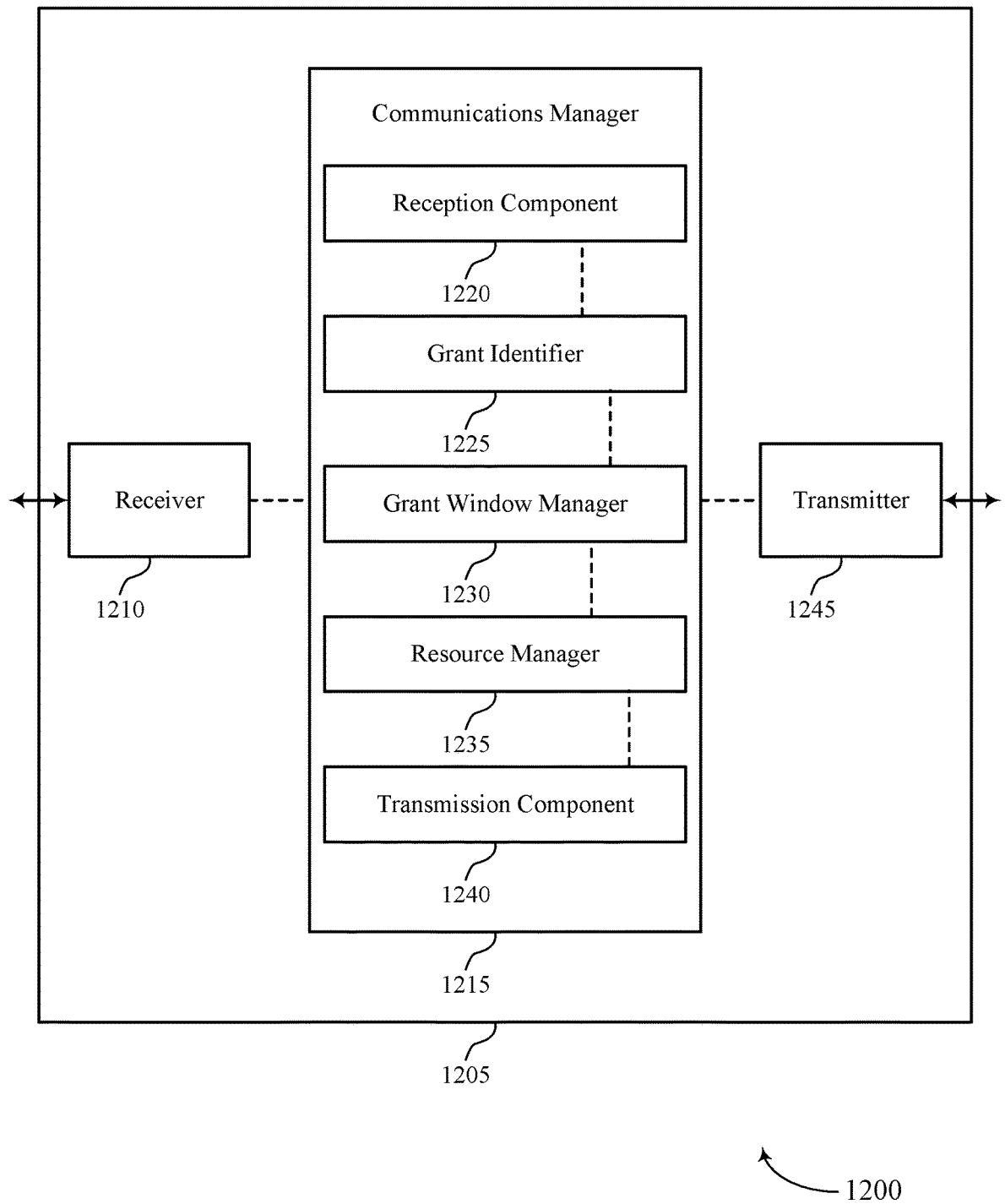

FIG. 12 shows a block diagram 1200 of a device 1205 that supports dual connectivity transmission techniques in accordance with aspects of the present disclosure. The device 1205 may be an example of aspects of a device 1105 or a base station 105 as described herein. The device 1205 may include a receiver 1210, a communications manager 1215, and a transmitter 1245. The device 1205 may also include a processor. Each of these components may be in communication (e.g., coupled) with one another (e.g., via one or more buses).

The receiver 1210 may receive information such as packets, user data, or control information associated with various information channels (e.g., control channels, data channels, and information related to dual connectivity transmission techniques, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a reception component 1220, a grant identifier 1225, a grant window manager 1230, a resource manager 1235, and a transmission component 1240. The communications manager 1215 may be an example of aspects of the communications manager 1410 described herein.

The reception component 1220 may receive an indication of a grant window value from a UE operating in dual connectivity mode. The grant window value may be based on a capability of the UE.

The grant identifier 1225 may identify a first grant for a first set of time resources allocated to the UE for a first uplink transmission via a first RAT.

The grant window manager 1230 may determine a grant window for the UE based on the indication of the grant window value. The grant window may determine with respect to (e.g., measure from) the first set of time resources.

The resource manager 1235 may determine a set of downlink resources for transmission of a second grant to the UE based on the grant window. The second grant may indicate a second set of time resources allocated to the UE for a second uplink transmission via a second RAT.

The transmission component 1240 may transmit the second grant to the UE via the set of downlink resources.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
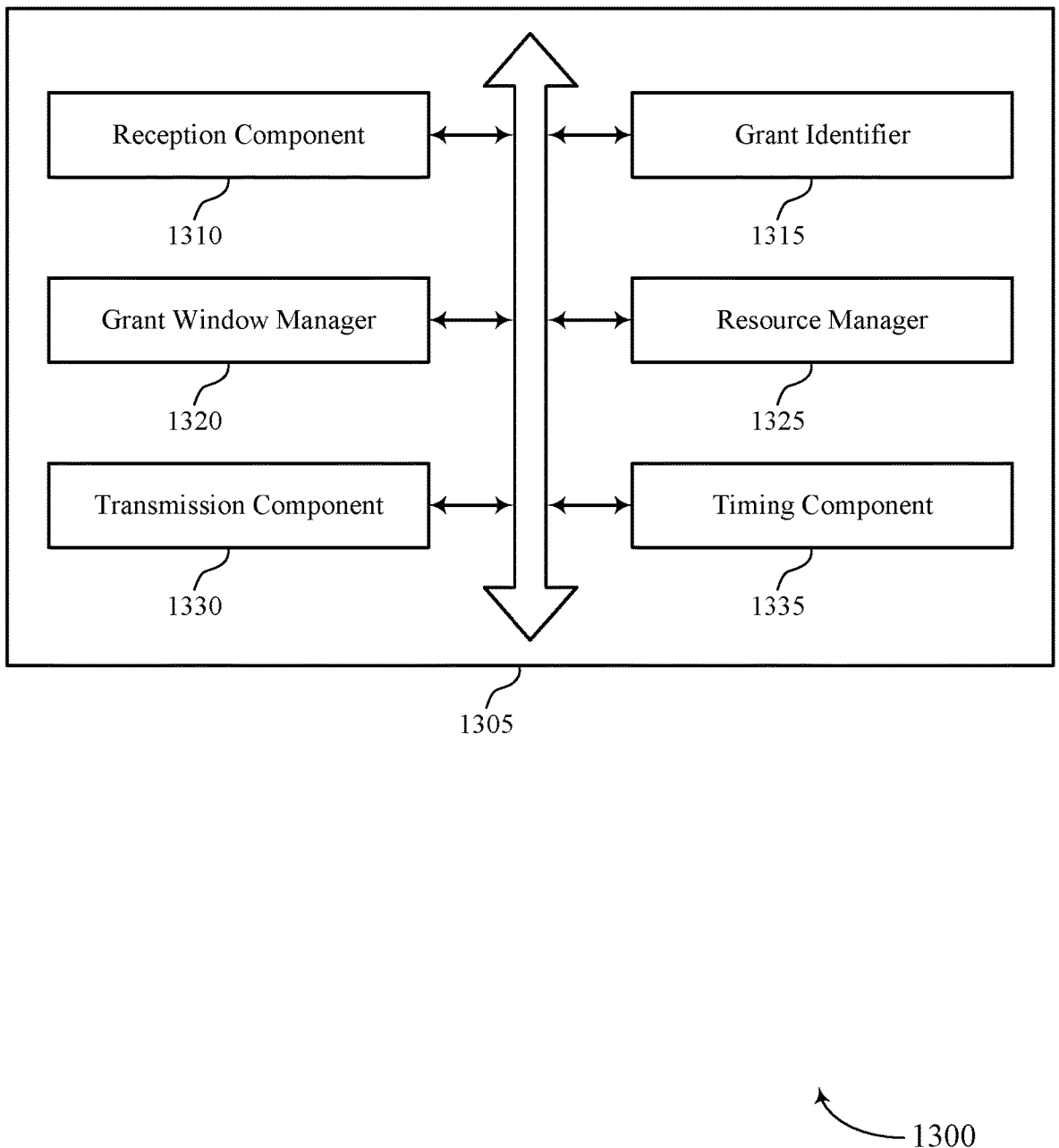
FIG. 13 shows a block diagram of a communications manager that supports dual connectivity transmission techniques in accordance with aspects of the present disclosure.

FIG. 13 shows a block diagram 1300 of a communications manager 1305 that supports dual connectivity transmission techniques in accordance with aspects of the present disclosure. The communications manager 1305 may be an example of aspects of a communications manager 1115, a communications manager 1215, or a communications manager 1410 described herein. The communications manager 1305 may include a reception component 1310, a grant identifier 1315, a grant window manager 1320, a resource manager 1325, a transmission component 1330, and a timing component 1335. Each of these modules may communicate, directly or indirectly, with one another (e.g., via one or more buses).

The reception component 1310 may receive an indication of a grant window value from a UE operating in dual connectivity mode based on a capability of the UE. In some examples, the reception component 1310 may receive the second uplink transmission from the UE via the second set of time resources. In some examples, the reception component 1310 may receive, from a second base station, an indication of the first grant via a backhaul link. The second base station may support communications via the first RAT.

The grant identifier 1315 may identify a first grant for a first set of time resources allocated to the UE for a first uplink transmission via a first RAT. In some cases, the first uplink transmission is associated with a processing timeline different from the second uplink transmission.

The grant window manager 1320 may determine a grant window for the UE based on the indication of the grant window value. The grant window may be determined with respect to the first set of time resources.

The resource manager 1325 may determine a set of downlink resources for transmission of a second grant to the UE based on the grant window. The second grant may indicate a second set of time resources allocated to the UE for a second uplink transmission via a second RAT. In some cases, the first RAT includes one of a NR RAT or an LTE RAT and the second RAT includes the other of the NR RAT or the LTE RAT. In some examples, the resource manager 1325 may determine that the second set of time resources at least partially overlaps with the first set of time resources.

The transmission component 1330 may transmit the second grant to the UE via the set of downlink resources.

The timing component 1335 may exchange a set of timing values with a second base station, where the grant window is determined based on the set of timing values. In some examples, the timing component 1335 may select the set of timing values based on a processing timeline associated with the first uplink transmission or the second uplink transmission. In some cases, timing component 1335 may transmit the indication of the grant window or a grant window size to a second base station.

Figure 14:
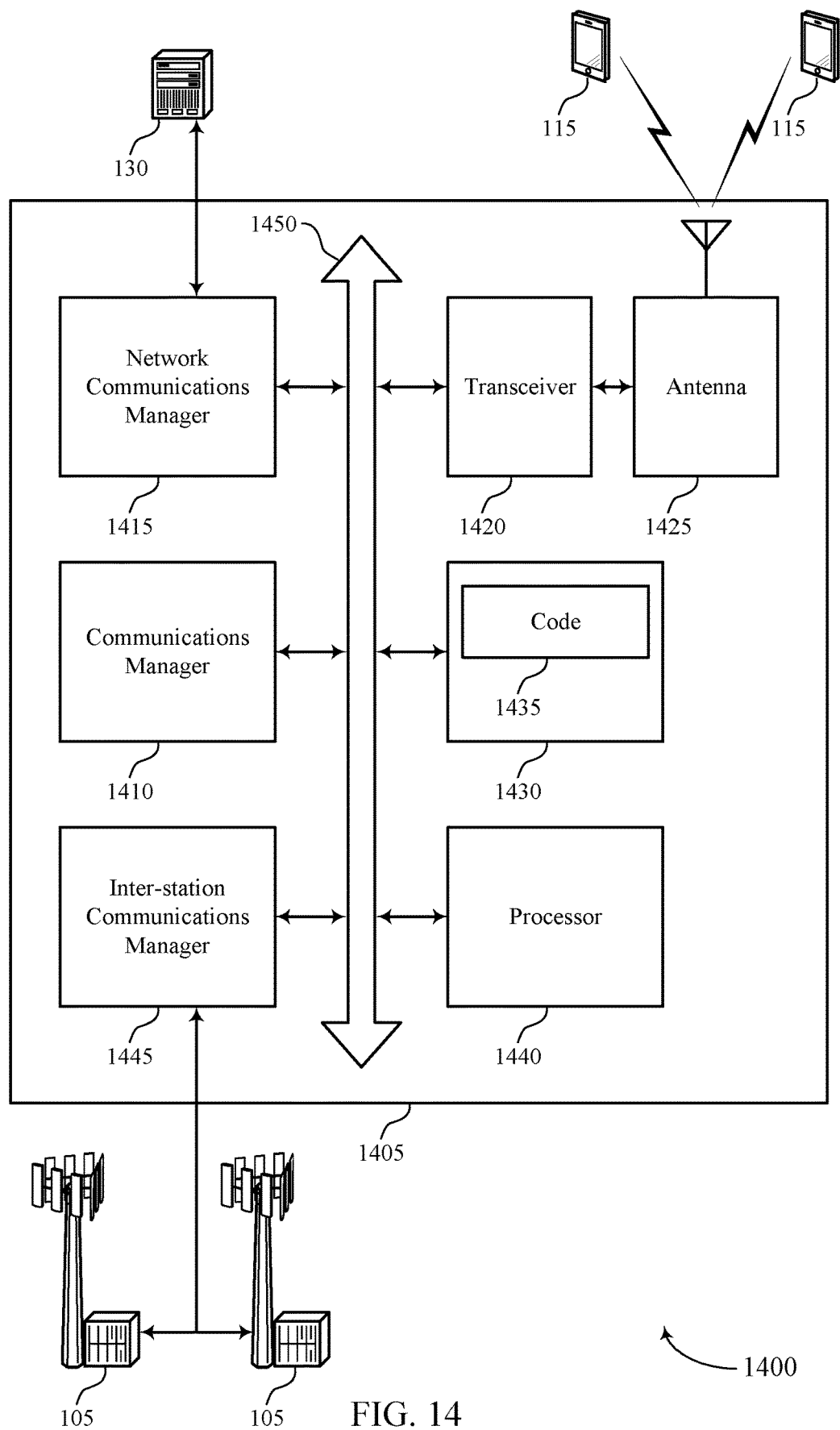
FIG. 14 shows a diagram of a system including a device that supports dual connectivity transmission techniques in accordance with aspects of the present disclosure.

FIG. 14 shows a diagram of a system 1400 including a device 1405 that supports dual connectivity transmission techniques in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be coupled via one or more buses (e.g., bus 1450).

The communications manager 1410 may receive an indication of a grant window value from a UE operating in dual connectivity mode based on a capability of the UE. The communications manager 1410 may identify a first grant for a first set of time resources allocated to the UE for a first uplink transmission via a first RAT. The communications manager 1410 may determine a grant window for the UE based on the indication of the grant window value. The grant window may be determined with respect to the first set of time resources. The communications manager 1410 may determine a set of downlink resources for transmission of a second grant to the UE based on the grant window. The second grant may indicate a second set of time resources allocated to the UE for a second uplink transmission via a second RAT. The communications manager 1410 may transmit the second grant to the UE via the set of downlink resources.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting dual connectivity transmission techniques).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
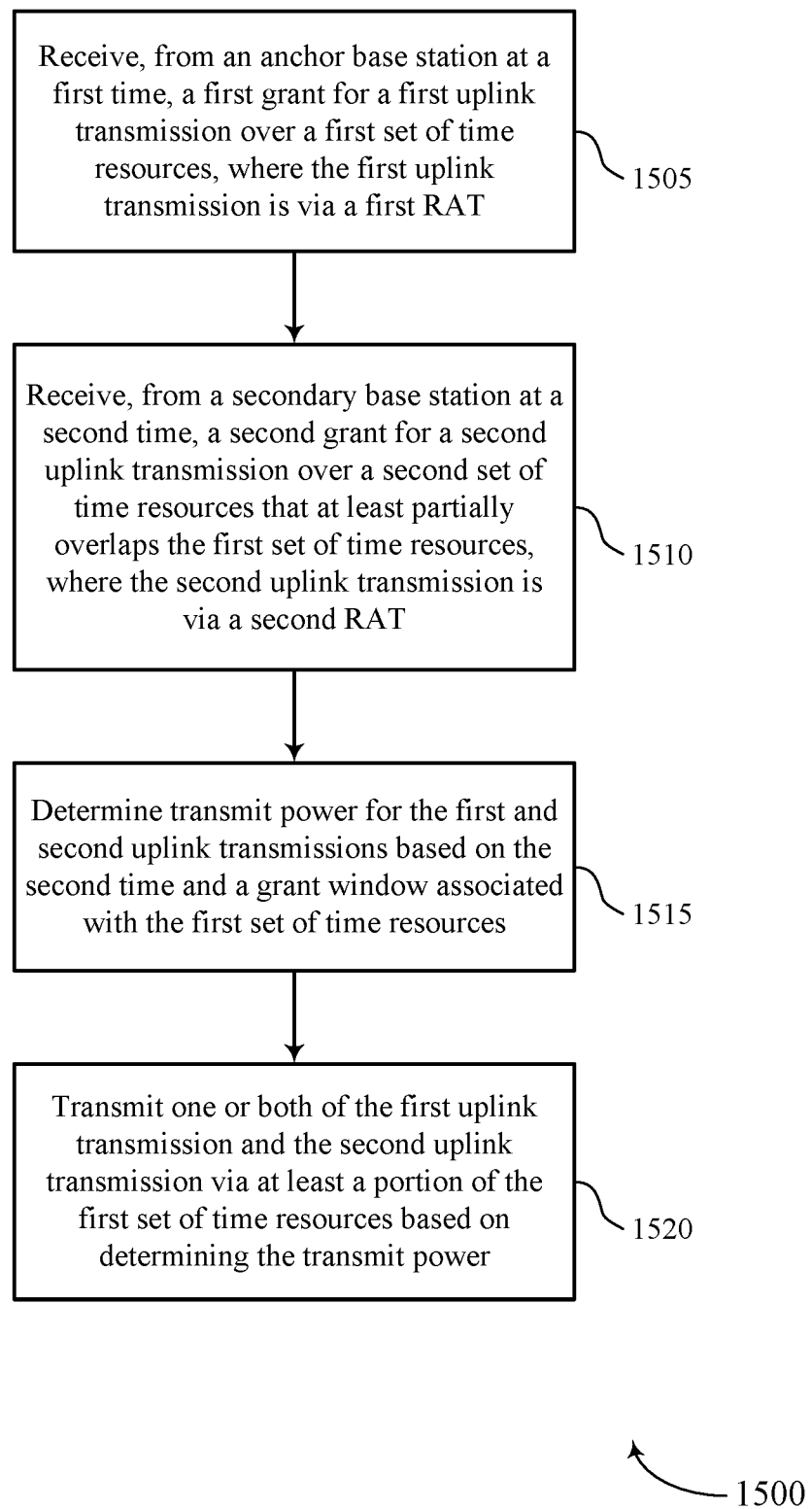
FIGS. 15 through 20 show flowcharts illustrating methods that support dual connectivity transmission techniques in accordance with aspects of the present disclosure.

FIG. 15 shows a flowchart illustrating a method 1500 that supports dual connectivity transmission techniques in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described hereinusing special-purpose hardware.

At 1505, the UE may receive, from an anchor base station at a first time, a first grant for a first uplink transmission over a first set of time resources. The first uplink transmission may be via a first RAT. The operations of 1505 may be performed according to the methods described herein. In some examples, aspects of the operations of 1505 may be performed by a reception component as described with reference to FIGS. 7 through 10.

At 1510, the UE may receive, from a secondary base station at a second time, a second grant for a second uplink transmission over a second set of time resources that at least partially overlaps the first set of time resources. The second uplink transmission may be via a second RAT. The operations of 1510 may be performed according to the methods described herein. In some examples, aspects of the operations of 1510 may be performed by a reception component as described with reference to FIGS. 7 through 10.

At 1515, the UE may determine transmit power for the first and second uplink transmissions based on the second time and a grant window associated with the first set of time resources. The operations of 1515 may be performed according to the methods described herein. In some examples, aspects of the operations of 1515 may be performed by a transmit power manager as described with reference to FIGS. 7 through 10.

At 1520, the UE may transmit one or both of the first uplink transmission and the second uplink transmission via at least a portion of the first set of time resources based on determining the transmit power. The operations of 1520 may be performed according to the methods described herein. In some examples, aspects of the operations of 1520 may be performed by a transmission component as described with reference to FIGS. 7 through 10.

Figure 16:
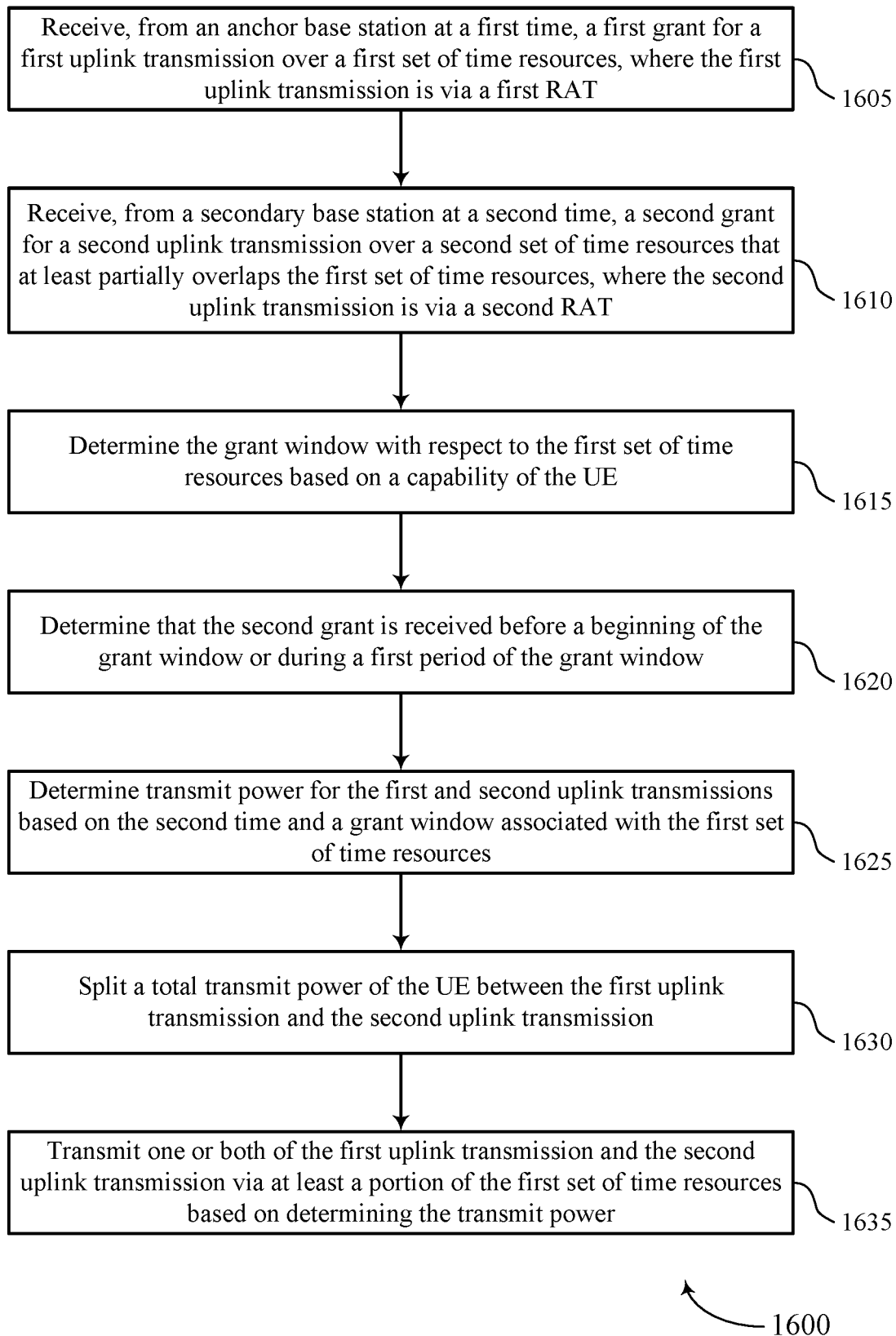

FIG. 16 shows a flowchart illustrating a method 1600 that supports dual connectivity transmission techniques in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from an anchor base station at a first time, a first grant for a first uplink transmission over a first set of time resources. The first uplink transmission may be via a first RAT. The operations of 1605 may be performed according to the methods described herein. In some examples, aspects of the operations of 1605 may be performed by a reception component as described with reference to FIGS. 7 through 10.

At 1610, the UE may receive, from a secondary base station at a second time, a second grant for a second uplink transmission over a second set of time resources that at least partially overlaps the first set of time resources. The second uplink transmission may be via a second RAT. The operations of 1610 may be performed according to the methods described herein. In some examples, aspects of the operations of 1610 may be performed by a reception component as described with reference to FIGS. 7 through 10.

At 1615, the UE may determine the grant window with respect to the first set of time resources based on a capability of the UE. The operations of 1615 may be performed according to the methods described herein. In some examples, aspects of the operations of 1615 may be performed by a grant window manager as described with reference to FIGS. 7 through 10.

At 1620, the UE may determine that the second grant is received before a beginning of the grant window or during a first period of the grant window. The operations of 1620 may be performed according to the methods described herein. In some examples, aspects of the operations of 1620 may be performed by a grant window manager as described with reference to FIGS. 7 through 10.

At 1625, the UE may determine transmit power for the first and second uplink transmissions based on the second time and a grant window associated with the first set of time resources. The operations of 1625 may be performed according to the methods described herein. In some examples, aspects of the operations of 1625 may be performed by a transmit power manager as described with reference to FIGS. 7 through 10.

At 1630, the UE may split a total transmit power of the UE between the first uplink transmission and the second uplink transmission. The operations of 1630 may be performed according to the methods described herein. In some examples, aspects of the operations of 1630 may be performed by a transmit power manager as described with reference to FIGS. 7 through 10.

At 1635, the UE may transmit one or both of the first uplink transmission and the second uplink transmission via at least a portion of the first set of time resources based on determining the transmit power. The operations of 1635 may be performed according to the methods described herein. In some examples, aspects of the operations of 1635 may be performed by a transmission component as described with reference to FIGS. 7 through 10.

Figure 17:
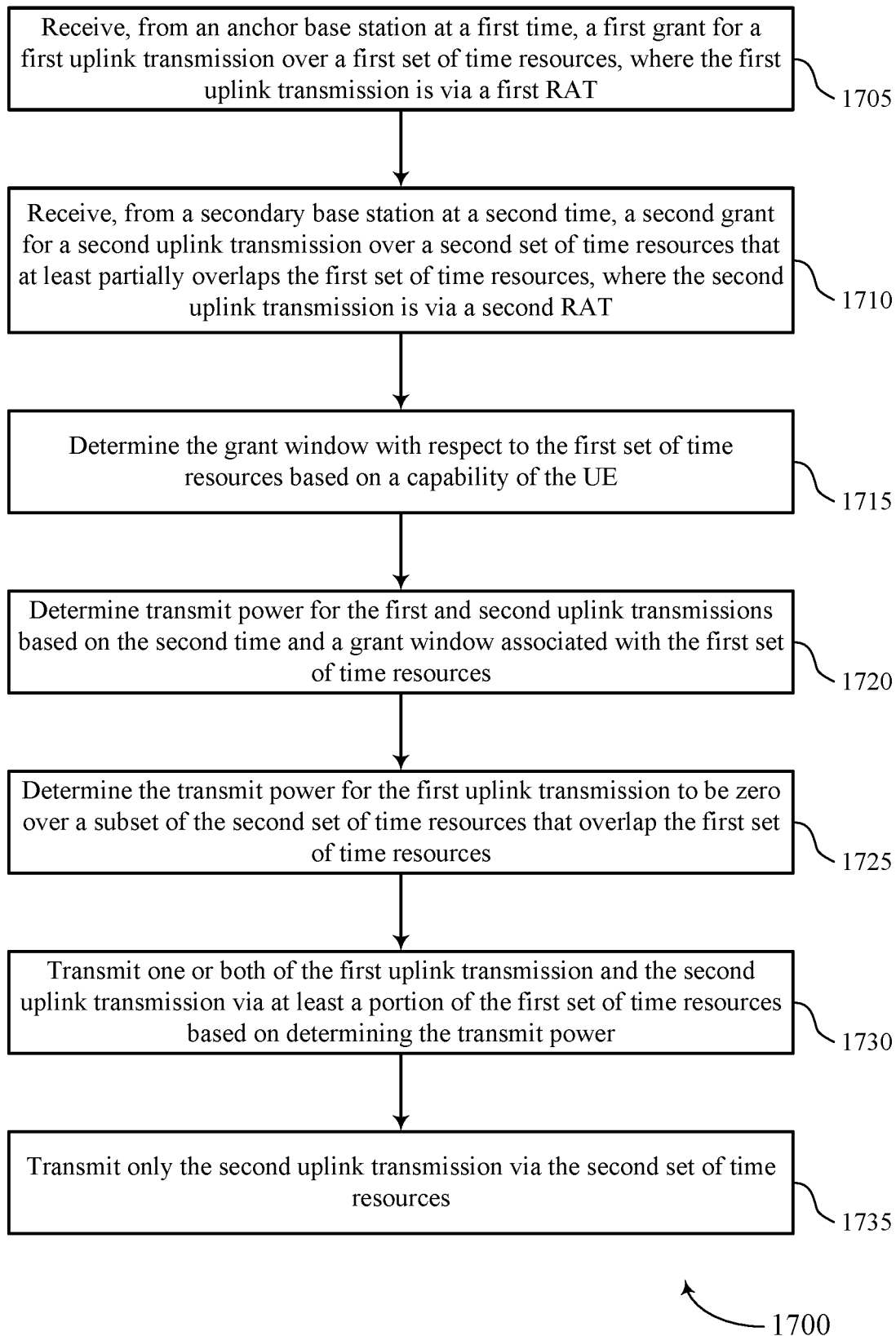

FIG. 17 shows a flowchart illustrating a method 1700 that supports dual connectivity transmission techniques in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, from an anchor base station at a first time, a first grant for a first uplink transmission over a first set of time resources, where the first uplink transmission is via a first RAT. The operations of 1705 may be performed according to the methods described herein. In some examples, aspects of the operations of 1705 may be performed by a reception component as described with reference to FIGS. 7 through 10.

At 1710, the UE may receive, from a secondary base station at a second time, a second grant for a second uplink transmission over a second set of time resources that at least partially overlaps the first set of time resources, where the second uplink transmission is via a second RAT. The operations of 1710 may be performed according to the methods described herein. In some examples, aspects of the operations of 1710 may be performed by a reception component as described with reference to FIGS. 7 through 10.

At 1715, the UE may determine the grant window with respect to the first set of time resources based on a capability of the UE. The operations of 1715 may be performed according to the methods described herein. In some examples, aspects of the operations of 1715 may be performed by a grant window manager as described with reference to FIGS. 7 through 10.

At 1720, the UE may determine transmit power for the first and second uplink transmissions based on the second time and a grant window associated with the first set of time resources. The operations of 1720 may be performed according to the methods described herein. In some examples, aspects of the operations of 1720 may be performed by a transmit power manager as described with reference to FIGS. 7 through 10.

At 1725, the UE may determine the transmit power for the first uplink transmission to be zero over a subset of the second set of time resources that overlap the first set of time resources. The operations of 1725 may be performed according to the methods described herein. In some examples, aspects of the operations of 1725 may be performed by a transmit power manager as described with reference to FIGS. 7 through 10.

At 1730, the UE may transmit one or both of the first uplink transmission and the second uplink transmission via at least a portion of the first set of time resources based on determining the transmit power. The operations of 1730 may be performed according to the methods described herein. In some examples, aspects of the operations of 1730 may be performed by a transmission component as described with reference to FIGS. 7 through 10.

At 1735, the UE may transmit the second uplink transmission via the second set of time resources. The operations of 1735 may be performed according to the methods described herein. In some examples, aspects of the operations of 1735 may be performed by a transmission component as described with reference to FIGS. 7 through 10.

Figure 18:
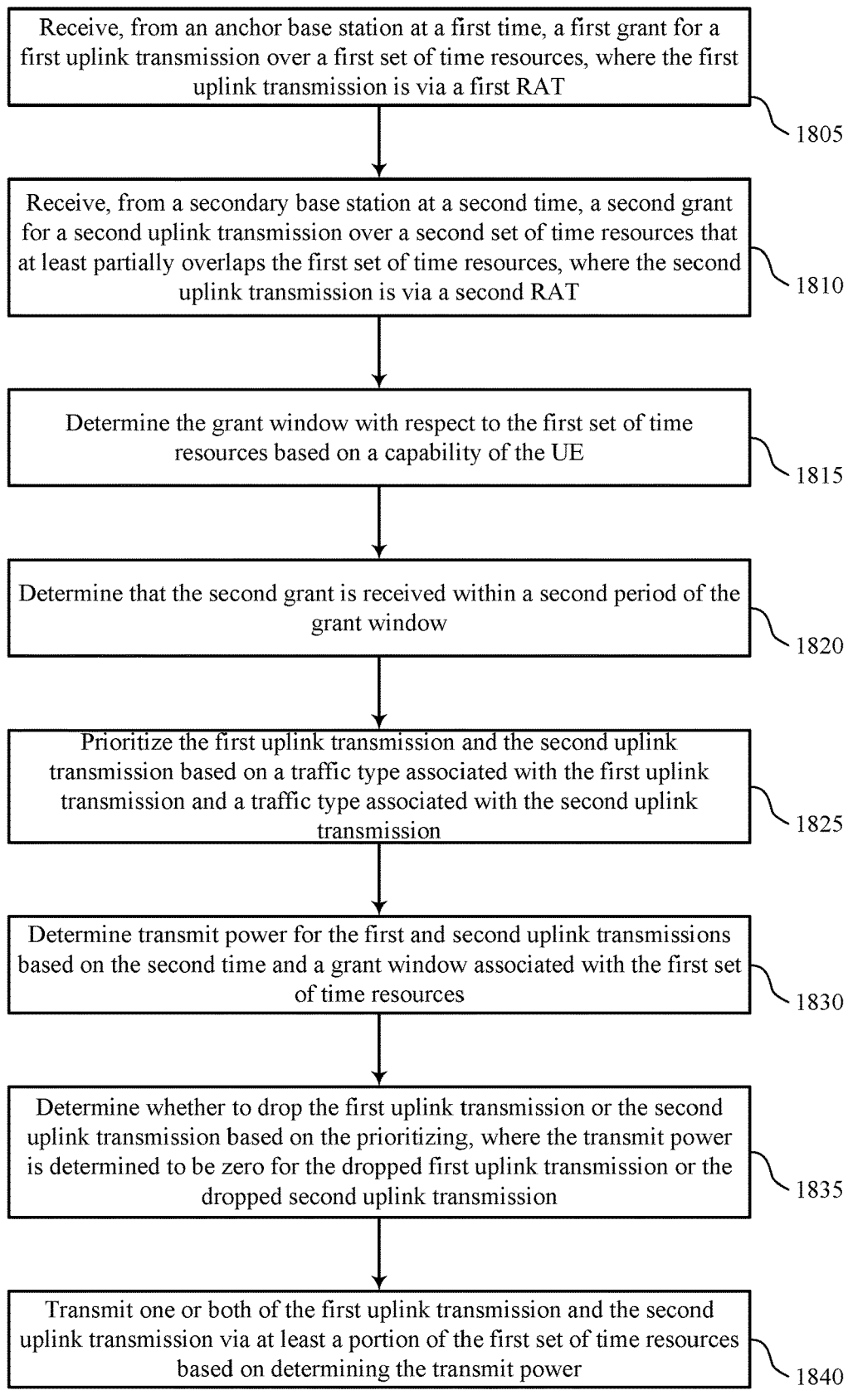

FIG. 18 shows a flowchart illustrating a method 1800 that supports dual connectivity transmission techniques in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may receive, from an anchor base station at a first time, a first grant for a first uplink transmission over a first set of time resources. The first uplink transmission may be via a first RAT. The operations of 1805 may be performed according to the methods described herein. In some examples, aspects of the operations of 1805 may be performed by a reception component as described with reference to FIGS. 7 through 10.

At 1810, the UE may receive, from a secondary base station at a second time, a second grant for a second uplink transmission over a second set of time resources that at least partially overlaps the first set of time resources. The second uplink transmission may be via a second RAT. The operations of 1810 may be performed according to the methods described herein. In some examples, aspects of the operations of 1810 may be performed by a reception component as described with reference to FIGS. 7 through 10.

At 1815, the UE may determine the grant window with respect to the first set of time resources based on a capability of the UE. The operations of 1815 may be performed according to the methods described herein. In some examples, aspects of the operations of 1815 may be performed by a grant window manager as described with reference to FIGS. 7 through 10.

At 1820, the UE may determine that the second grant is received within a second period of the grant window. The operations of 1820 may be performed according to the methods described herein. In some examples, aspects of the operations of 1820 may be performed by a grant window manager as described with reference to FIGS. 7 through 10.

At 1825, the UE may prioritize the first uplink transmission and the second uplink transmission based on a traffic type associated with the first uplink transmission and a traffic type associated with the second uplink transmission. The operations of 1825 may be performed according to the methods described herein. In some examples, aspects of the operations of 1825 may be performed by a prioritization manager as described with reference to FIGS. 7 through 10.

At 1830, the UE may determine transmit power for the first and second uplink transmissions based on the second time and a grant window associated with the first set of time resources. The operations of 1830 may be performed according to the methods described herein. In some examples, aspects of the operations of 1830 may be performed by a transmit power manager as described with reference to FIGS. 7 through 10.

At 1835, the UE may determine whether to drop the first uplink transmission or the second uplink transmission based on the prioritizing, where the transmit power is determined to be zero for the dropped first uplink transmission or the dropped second uplink transmission. The operations of 1835 may be performed according to the methods described herein. In some examples, aspects of the operations of 1835 may be performed by a transmit power manager as described with reference to FIGS. 7 through 10.

At 1840, the UE may transmit one or both of the first uplink transmission and the second uplink transmission via at least a portion of the first set of time resources based on determining the transmit power. The operations of 1840 may be performed according to the methods described herein. In some examples, aspects of the operations of 1840 may be performed by a transmission component as described with reference to FIGS. 7 through 10.

Figure 19:
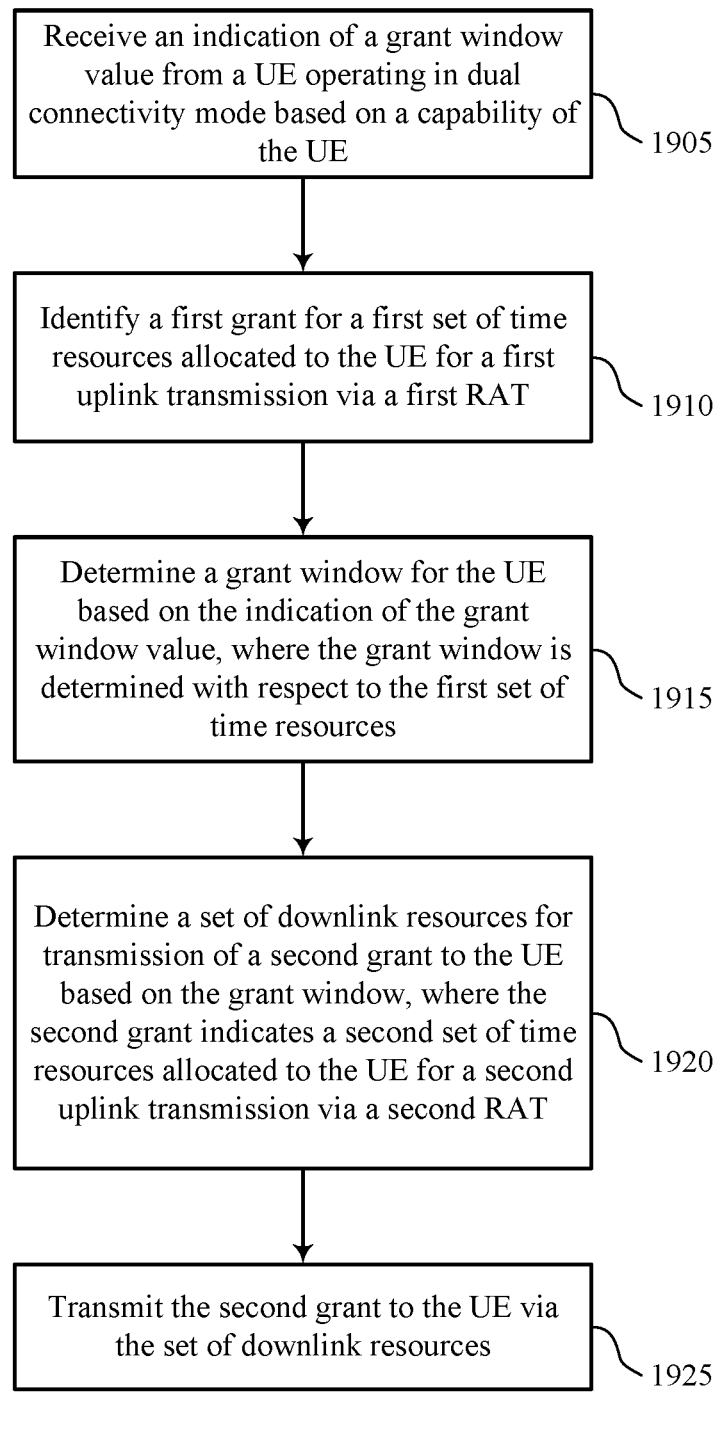

FIG. 19 shows a flowchart illustrating a method 1900 that supports dual connectivity transmission techniques in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may receive an indication of a grant window value from a UE operating in dual connectivity mode based on a capability of the UE. The operations of 1905 may be performed according to the methods described herein. In some examples, aspects of the operations of 1905 may be performed by a reception component as described with reference to FIGS. 11 through 14.

At 1910, the base station may identify a first grant for a first set of time resources allocated to the UE for a first uplink transmission via a first RAT. The operations of 1910 may be performed according to the methods described herein. In some examples, aspects of the operations of 1910 may be performed by a grant identifier as described with reference to FIGS. 11 through 14.

At 1915, the base station may determine a grant window for the UE based on the indication of the grant window value. The grant window may be determined with respect to the first set of time resources. The operations of 1915 may be performed according to the methods described herein. In some examples, aspects of the operations of 1915 may be performed by a grant window manager as described with reference to FIGS. 11 through 14.

At 1920, the base station may determine a set of downlink resources for transmission of a second grant to the UE based on the grant window. The second grant may indicate a second set of time resources allocated to the UE for a second uplink transmission via a second RAT. The operations of 1920 may be performed according to the methods described herein. In some examples, aspects of the operations of 1920 may be performed by a resource manager as described with reference to FIGS. 11 through 14.

At 1925, the base station may transmit the second grant to the UE via the set of downlink resources. The operations of 1925 may be performed according to the methods described herein. In some examples, aspects of the operations of 1925 may be performed by a transmission component as described with reference to FIGS. 11 through 14.

Figure 20:
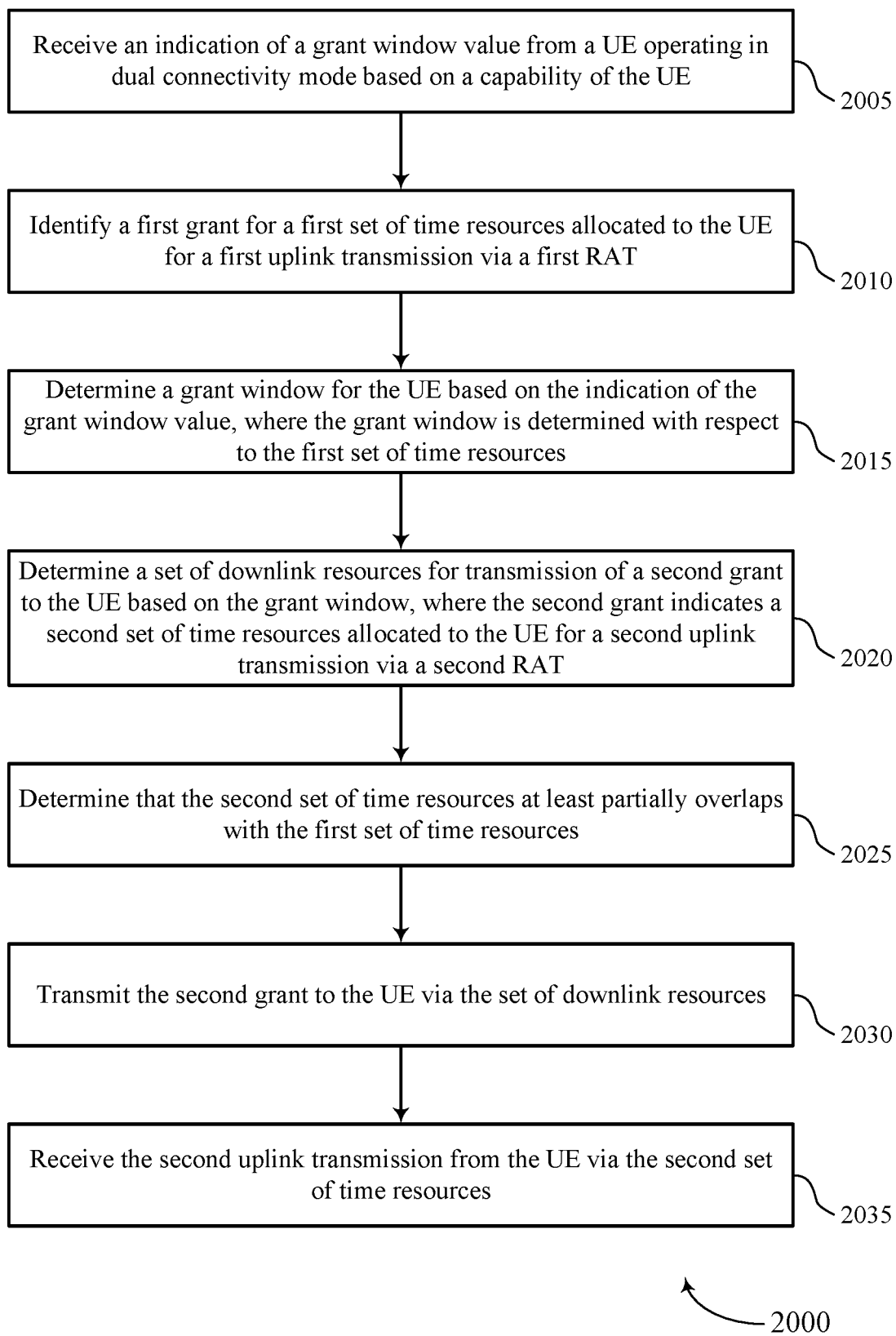

FIG. 20 shows a flowchart illustrating a method 2000 that supports dual connectivity transmission techniques in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may receive an indication of a grant window value from a UE operating in dual connectivity mode based on a capability of the UE. The operations of 2005 may be performed according to the methods described herein. In some examples, aspects of the operations of 2005 may be performed by a reception component as described with reference to FIGS. 11 through 14.

At 2010, the base station may identify a first grant for a first set of time resources allocated to the UE for a first uplink transmission via a first RAT. The operations of 2010 may be performed according to the methods described herein. In some examples, aspects of the operations of 2010 may be performed by a grant identifier as described with reference to FIGS. 11 through 14.

At 2015, the base station may determine a grant window for the UE based on the indication of the grant window value. The grant window may determine with respect to the first set of time resources. The operations of 2015 may be performed according to the methods described herein. In some examples, aspects of the operations of 2015 may be performed by a grant window manager as described with reference to FIGS. 11 through 14.

At 2020, the base station may determine a set of downlink resources for transmission of a second grant to the UE based on the grant window. The second grant may indicate a second set of time resources allocated to the UE for a second uplink transmission via a second RAT. The operations of 2020 may be performed according to the methods described herein. In some examples, aspects of the operations of 2020 may be performed by a resource manager as described with reference to FIGS. 11 through 14.

At 2025, the base station may determine that the second set of time resources at least partially overlaps with the first set of time resources. The operations of 2025 may be performed according to the methods described herein. In some examples, aspects of the operations of 2025 may be performed by a resource manager as described with reference to FIGS. 11 through 14.

At 2030, the base station may transmit the second grant to the UE via the set of downlink resources. The operations of 2030 may be performed according to the methods described herein. In some examples, aspects of the operations of 2030 may be performed by a transmission component as described with reference to FIGS. 11 through 14.

At 2035, the base station may receive the second uplink transmission from the UE via the second set of time resources. The operations of 2035 may be performed according to the methods described herein. In some examples, aspects of the operations of 2035 may be performed by a reception component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems 100 or 200 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE) in a dual connectivity system, comprising:
   receiving, from an anchor network device at a first time, a first grant for a first uplink transmission over a first set of time resources, wherein the first uplink transmission is via a first radio access technology (RAT);
   receiving, from a secondary network device at a second time, a second grant for a second uplink transmission over a second set of time resources that at least partially overlaps the first set of time resources, wherein the second uplink transmission is via a second RAT;
   determining a first transmit power allocation for the first and second uplink transmissions based at least in part on the second grant being received during a first period of a grant window associated with the first set of time resources or a second transmit power allocation for the first and second uplink transmissions based at least in part on the second grant being received during a second period of the grant window, the first period being defined relative to a beginning of the first uplink transmission and the second period being defined relative to the beginning of the first uplink transmission different from the first period; and
   transmitting one or both of the first uplink transmission and the second uplink transmission via at least a portion of the first set of time resources based at least in part on the first transmit power allocation or the second transmit power allocation.

2. The method of claim 1, further comprising:
   determining the grant window with respect to the first set of time resources based at least in part on a processing time capability of the UE.

3. The method of claim 2, further comprising:
   determining that the second grant is received during the first period of the grant window; and
   splitting a total transmit power of the UE between the first uplink transmission and the second uplink transmission according to the first transmit power allocation.

4. The method of claim 2, further comprising:
   reducing a transmit power for the first uplink transmission over one or more symbols of the second set of time resources that overlap the first set of time resources based at least in part on repetitions associated with a repetition transmitting mode corresponding to the second uplink transmission.

5. The method of claim 4, wherein the one or more symbols of the second set of time resources comprises a portion of a slot of the second set of time resources.

6. The method of claim 2, further comprising:
   determining that the second grant is received within the second period of the grant window;
   prioritizing the first uplink transmission and the second uplink transmission based at least in part on a traffic type associated with the first uplink transmission and a traffic type associated with the second uplink transmission; and
   determining whether to drop the first uplink transmission or the second uplink transmission based at least in part on the prioritizing, wherein a transmit power is determined to be zero for the dropped first uplink transmission or the dropped second uplink transmission according to the second transmit power allocation.

7. The method of claim 6, wherein the traffic type comprises one of acknowledgement (ACK) information, negative ACK (NACK) information, a demodulation reference signal (DMRS), or ultra-reliable low latency communications (URLLC).

8. The method of claim 6, wherein:
   the prioritization is based at least in part on whether repetitions associated with a repetition transmitting mode are assigned to only one of the first uplink transmission or the second uplink transmission.

9. The method of claim 2, further comprising:
   determining that the second grant is received within a third period of the grant window;
   determining a transmit power for the second uplink transmission to be zero; and
   transmitting only the first uplink transmission via the first set of time resources.

10. The method of claim 2, wherein the grant window at least partially overlaps the first set of time resources, wherein a transmit power for the first uplink transmission and the second uplink transmission is determined on a per-symbol basis based at least in part on the grant window at least partially overlapping the first set of time resources.

11. The method of claim 2, wherein the grant window is defined on a per-symbol basis for one or more symbols of the first set of time resources.

12. The method of claim 2, further comprising:
   transmitting, to at least one of the anchor network device or the secondary network device, an indication of the grant window.

13. The method of claim 12, further comprising:
   including a timing advance value with the indication of the grant window.

14. The method of claim 1, further comprising:
receiving, at a third time, a third grant for a third uplink transmission over a third set of time resources that at least partially overlaps the first set of time resources, wherein the third uplink transmission is associated with a subframe-based transmission time interval (TTI).

15. The method of claim 14, further comprising:
determining to drop the first uplink transmission, the second uplink transmission, or the third uplink transmission based at least in part on a set of priorities; and
determining transmit power for all undropped transmissions based at least in part on a total transmit power for the UE.

16. The method of claim 1, further comprising:
determining transmit power for the first uplink transmission prior to receiving the second grant; and
adjusting transmit power for the first uplink transmission after receiving the second grant.

17. The method of claim 1, wherein the first uplink transmission is associated with a processing timeline different from the second uplink transmission.

18. The method of claim 1, wherein the first RAT comprises one of a New Radio (NR) RAT or a Long Term Evolution (LTE) RAT and the second RAT comprises the other of the NR RAT or the LTE RAT.

19. A method for wireless communication at a network device in a dual connectivity system, comprising:
receiving an indication of a grant window value from a user equipment (UE) operating in dual connectivity mode, the grant window value being different from a processing timeline value corresponding to a processing time capability of the UE;
identifying a first grant for a first set of time resources allocated to the UE for a first uplink transmission via a first radio access technology (RAT);
determining a grant window for the UE based at least in part on the indication of the grant window value, wherein the grant window is determined with respect to the first set of time resources and comprises a first period defined relative to a beginning of the first uplink transmission and a second period defined relative to the beginning of the first uplink transmission different from the first period;
determining a set of downlink resources for transmission of a second grant to the UE based at least in part on the grant window and a transmission time interval (TTI) of the first uplink transmission, wherein the second grant indicates a second set of time resources allocated to the UE for a second uplink transmission via a second RAT; and
transmitting the second grant to the UE via the set of downlink resources.

20. The method of claim 19, wherein determining the set of downlink resources comprises:
determining that the second set of time resources at least partially overlaps with the first set of time resources and that the TTI of the first uplink transmission is shorter than a TTI of the second uplink transmission.

21. The method of claim 19, further comprising:
receiving the second uplink transmission from the UE via the second set of time resources.

22. The method of claim 19, wherein identifying the first grant comprises:
receiving, from a second network device, an indication of the first grant via a backhaul link, wherein the second network device supports communications via the first RAT.

23. The method of claim 19, further comprising:
transmitting the indication of the grant window or a grant window size to a second network device.

24. The method of claim 19, further comprising:
exchanging a set of timing values with a second network device, wherein the grant window is determined based at least in part on the set of timing values.

25. The method of claim 24, further comprising:
selecting the set of timing values based at least in part on a processing timeline associated with the first uplink transmission or the second uplink transmission.

26. The method of claim 19, wherein the first uplink transmission is associated with a processing timeline different from the second uplink transmission.

27. The method of claim 19, wherein the first RAT comprises one of a New Radio (NR) RAT or a Long Term Evolution (LTE) RAT and the second RAT comprises the other of the NR RAT or the LTE RAT.

28. An apparatus for wireless communications at a user equipment (UE) in a dual connectivity system, comprising:
a processor, memory coupled with the processor; and
instructions stored in the memory and executable by the processor to cause the apparatus to:
receive, from an anchor network device at a first time, a first grant for a first uplink transmission over a first set of time resources, wherein the first uplink transmission is via a first radio access technology (RAT);
receive, from a secondary network device at a second time, a second grant for a second uplink transmission over a second set of time resources that at least partially overlaps the first set of time resources, wherein the second uplink transmission is via a second RAT;
determine a first transmit power allocation for the first and second uplink transmissions based at least in part on the second grant being received during a first period of a grant window associated with the first set of time resources or a second transmit power allocation for the first and second uplink transmissions based at least in part on the second grant being received during a second period of the grant window, the first period being defined relative to a beginning of the first uplink transmission and the second period being defined relative to the beginning of the first uplink transmission different from the first period; and
transmit one or both of the first uplink transmission and the second uplink transmission via at least a portion of the first set of time resources based at least in part on the first transmit power allocation or the second transmit power allocation.

29. The apparatus of claim 28, wherein the instructions are further executable by the processor to cause the apparatus to:
determine the grant window with respect to the first set of time resources based at least in part on a processing time capability of the UE.

30. An apparatus for wireless communication at a network device in a dual connectivity system, comprising:
a processor, memory coupled with the processor; and
instructions stored in the memory and executable by the processor to cause the apparatus to:
receive an indication of a grant window value from a user equipment (UE) operating in dual connectivity mode, the grant window value being different from a processing timeline value corresponding to a processing time capability of the UE;

identify a first grant for a first set of time resources allocated to the UE for a first uplink transmission via a first radio access technology (RAT);

determine a grant window for the UE based at least in part on the indication of the grant window value, wherein the grant window is determined with respect to the first set of time resources and comprises a first period defined relative to a beginning of the first uplink transmission and a second period defined relative to the beginning of the first uplink transmission different from the first period;

determine a set of downlink resources for transmission of a second grant to the UE based at least in part on the grant window and a transmission time interval (TTI) of the first uplink transmission, wherein the second grant indicates a second set of time resources allocated to the UE for a second uplink transmission via a second RAT; and transmit the second grant to the UE via the set of downlink resources.

* * * * *